(12) United States Patent
Musgrove et al.

(10) Patent No.: US 7,082,426 B2
(45) Date of Patent: Jul. 25, 2006

(54) CONTENT AGGREGATION METHOD AND APPARATUS FOR AN ON-LINE PRODUCT CATALOG

(75) Inventors: Timothy Allen Musgrove, Moran Hill, CA (US); Robin Hiroko Walsh, San Francisco, CA (US)

(73) Assignee: CNET Networks, Inc., San Francisco, CA (US)

( * ) Notice: Subject to any disclaimer, the term of this patent is extended or adjusted under 35 U.S.C. 154(b) by 10 days.

(21) Appl. No.: 10/659,740

(22) Filed: Sep. 11, 2003

(65) Prior Publication Data

US 2004/0143600 A1 Jul. 22, 2004

Related U.S. Application Data

(63) Continuation-in-part of application No. 10/119,311, filed on Apr. 10, 2002, now Pat. No. 6,714,933, which is a continuation-in-part of application No. 09/566,734, filed on May 9, 2000, now Pat. No. 6,535,880.

(60) Provisional application No. 60/479,153, filed on Jun. 18, 1993.

(51) Int. Cl.
*G06F 17/30* (2006.01)
*G06F 17/27* (2006.01)
*G06Q 30/00* (2006.01)

(52) U.S. Cl. ............ 707/3; 707/10; 707/104.1; 715/500

(58) Field of Classification Search ............ 707/10, 707/104.1, 1–6; 705/26, 27; 715/500, 514
See application file for complete search history.

(56) References Cited

U.S. PATENT DOCUMENTS

| 4,707,592 A | 11/1987 | Ware |
| 5,231,566 A * | 7/1993 | Blutinger et al. ............ 705/27 |
| 5,319,542 A | 6/1994 | King, Jr. et al. |
| 5,420,926 A | 5/1995 | Low et al. |
| 5,550,746 A | 8/1996 | Jacobs |
| 5,592,375 A | 1/1997 | Salmon et al. |
| 5,666,493 A | 9/1997 | Wojcik et al. |
| 5,671,279 A | 9/1997 | Elgamal |
| 5,710,887 A | 1/1998 | Chelliah et al. |
| 5,715,314 A | 2/1998 | Payne et al. |
| 5,727,048 A | 3/1998 | Hiroshima et al. |
| 5,740,425 A * | 4/1998 | Povilus ............ 707/100 |

(Continued)

OTHER PUBLICATIONS

Poley et al., "The Potential for Trade Facilitated by the Internaet 1996-2000: a Review of Demand Supply and Internet Trade Models" Jan. 1998, Proceedings of the Thurty-First Hawaii International Conference on System Sciences, vol. 4 pp. 21-221.

(Continued)

*Primary Examiner*—Jack M Choules
(74) *Attorney, Agent, or Firm*—Marc S. Kaufman; Nixon Peabody LLP

(57) ABSTRACT

The method comprises processing plural product information records from the product information sources into one or more groups based on which product information records are likely to correspond to the same product, correlating a unique product ID corresponding to the product associated with each of said groups to identify the product, comparing each identified product to categories of a taxonomy to determine a category for the identified products in the taxonomy, and determining attributes for each categorized product based on the product information records corresponding to each group, creating product specifications based on the determined attributes and storing the product specification in the corresponding determined categories of the taxonomy.

100 Claims, 9 Drawing Sheets

U.S. PATENT DOCUMENTS

| | | |
|---|---|---|
| 5,742,768 A | 4/1998 | Gennaro et al. |
| 5,758,328 A | 5/1998 | Giovannoli |
| 5,758,329 A | 5/1998 | Wojcik et al. |
| 5,761,649 A | 6/1998 | Hill |
| 5,765,143 A | 6/1998 | Sheldon et al. |
| 5,774,872 A | 6/1998 | Golden et al. |
| 5,778,173 A | 7/1998 | Apte |
| 5,790,426 A | 8/1998 | Robinson |
| 5,790,677 A | 8/1998 | Fox et al. |
| 5,794,207 A | 8/1998 | Walker et al. |
| 5,794,221 A | 8/1998 | Egendorf |
| 5,802,497 A | 9/1998 | Manasse |
| 5,815,665 A | 9/1998 | Teper et al. |
| 5,825,884 A | 10/1998 | Zdepski et al. |
| 5,832,459 A | 11/1998 | Cameron et al. |
| 5,842,178 A | 11/1998 | Giovannoli |
| 5,878,141 A | 3/1999 | Daly et al. |
| 5,878,401 A | 3/1999 | Joseph |
| 5,890,175 A * | 3/1999 | Wong et al. ................. 715/505 |
| 5,895,454 A | 4/1999 | Harrington |
| 5,898,777 A | 4/1999 | Tycksen, Jr. et al. |
| 5,899,980 A | 5/1999 | Wilf et al. |
| 5,909,492 A | 6/1999 | Payne et al. |
| 5,909,673 A | 6/1999 | Gregory |
| 5,920,854 A | 7/1999 | Kirsch et al. |
| 5,930,768 A | 7/1999 | Hooban |
| 5,930,777 A | 7/1999 | Barber |
| 5,953,707 A | 9/1999 | Huang et al. |
| 5,961,593 A | 10/1999 | Gabber et al. |
| 5,966,697 A | 10/1999 | Fergerson et al. |
| 5,970,472 A | 10/1999 | Allsop et al. |
| 5,970,475 A | 10/1999 | Barnes et al. |
| 5,971,273 A | 10/1999 | Vallaire |
| 5,983,203 A | 11/1999 | Church et al. |
| 5,991,739 A | 11/1999 | Cupps et al. |
| 5,999,908 A | 12/1999 | Abelow |
| 5,999,919 A | 12/1999 | Jarecki et al. |
| 6,002,771 A | 12/1999 | Nielsen |
| 6,006,200 A | 12/1999 | Boies et al. |
| 6,023,683 A | 2/2000 | Johnson et al. |
| 6,032,130 A | 2/2000 | Alloul et al. |
| 6,125,352 A | 9/2000 | Franklin et al. |
| 6,154,738 A | 11/2000 | Call |
| 6,185,608 B1 | 2/2001 | Hon et al. |
| 6,209,029 B1 | 3/2001 | Epstein et al. |
| 6,304,864 B1 | 10/2001 | Liddy et al. |
| 6,405,175 B1 | 6/2002 | Ng |

OTHER PUBLICATIONS

Jones et al., "IndustryNet: a Model for Commerce on the World Wide Web" Oct. 1995, IEEE Expert, vol. 10, No. 5, pp. 54-59.

US 5,894,520, 04/1999, Nielsen (withdrawn)

* cited by examiner

CONTENT AGGREGATION METHOD AND APPARATUS FOR AN ON-LINE PRODUCT CATALOG

CROSS-REFERENCE TO RELATED APPLICATIONS

This application is a continuation in part of U.S. application Ser. No. 10/119,311 filed Apr. 10, 2002, now U.S. Pat. No. 6,714,933 which is a continuation-in-part of U.S. application Ser. No. 09/566,734, filed May 9, 2000 (U.S. Pat. No. 6,535,880 issued Mar. 18, 2003), the disclosures of which are incorporate herein by reference.

BACKGROUND OF THE INVENTION

1. Field of the Invention

The invention relates to systems for creating catalogs of goods and services over a communications network. More specifically, the invention is directed to a method and system for aggregating content for an on-line catalog system.

2. Description of the Related Art

The Internet is a worldwide network of computers linked together by various hardware communication links all running a standard suite of protocols known as TCP/IP (transmission control protocol/Internet protocol). The growth of the Internet over the last decade has been explosive, fueled in the most part by the widespread use of software viewers known as browsers and HTTP (hypertext transfer protocol) which allow a simple GUI (graphical user interface) to be used to communicate over the Internet. Browsers generally reside on the computer used to access content on the Internet, i.e. the client computer. HTTP is a component of TCP/IP and provides users access to files of various formats using a standard page description language known as HTML (hypertext markup language), and more recently XML (extensible markup language) and XHTML (extensible hypertext markup language), a reformulation of HTML into XML. The collection of servers on the Internet using HTTP has become known as the "World Wide Web" or simply the "Web."

As known and appreciated in the art, there are presently millions of Web pages with various content. Tools have been developed to allow the user to search these Web pages to obtain the various Web pages having the various content of interest. One way to locate the desired Web pages is to use a "search engine" which will search for Web pages having a particular keyword or key words. Search engines typically have three components: a crawler (such as a robot, bot or automated site searcher), an index, and a software program which presents the results of the search to the user. The crawler automatically "crawls" from Web server to Web server and the sites hosted therein to gather URLs and other information such as the text of the page that the search engine can use in the searches for keywords. When the information gathering by the crawler is completed, the information regarding the Web pages is stored in the search engine's databases and indexed. When a user seeking information from the Web types in a keyword(s) in a search field of the search engine, the search engine's software program then utilizes algorithmic functions and criteria to find keyword matches in the information stored in the databases. Some programs search all of the text of each page while other programs merely search the URLs and/or titles of the pages. The software program then sorts through the results of the search and provides a prioritized results to the user based on relevancy of the Web page. Various search engine software programs differ in their methods used for determining a Web page's relevancy. For example, the software may view the "meta tag" of the page, include a counter for counting the number of keyword occurrences on the text of the page, and/or consider the Web page's popularity as well as other factors such as whether the Webmaster of the Web page has made special arrangements to have the Web page displayed as a result of the search.

One of the primary applications of the Web has been shopping, i.e. the purchase of goods and services, i.e. products. Virtually every major commercial "bricks and mortar" merchant has established a Web site for the showcase and sale of their products. Further many manufacturers sell products directly over the Web. Finally, a plethora of on-line merchants, not previously existing in the bricks and mortar world, have come into existence. As a result, virtually every product is available for purchase over the Web from a plurality of merchants. This situation has increased the efficiency of markets by permitting shoppers to readily compare products and terms of sale from plural merchants without the need to travel physically to the merchant locations.

However, in order to compare products and terms of different merchants, one must "visit" the various merchant web sites individually. First, this requires knowledge of the URLs for each merchant Web site or the use of a search engine which can be cumbersome and inaccurate. It is possible to open the various sites in different browser windows for better comparison. However, the various formats of each merchant Web site render it tedious to compare products and terms directly. When a purchase decision is made, the purchase or purchases must be made through the individual merchant Web sites. Further, ordinarily the shopper is required to log in to each merchant Web site, by entering a username and password for example, prior to making a purchase and then proceed to the next site. For example, if the shopper decides to buy three items from three different merchants, three log in procedures and three buy procedures, i.e. procedures for effecting a purchase on the merchant Web sites, must be manually executed respectively through the three merchant Web sites and their proprietary interfaces.

It is well known to integrate a plurality of web sites into a single environment known as a "shopping portal." Shopping portals ordinarily include a Web server presenting an integrated interface displaying plural products from various merchants. Accordingly, conventional shopping portals facilitate comparison shopping and thus increase market efficiency. In order to provide an integrated shopping experience, it is known to prepare a catalog of product offerings from various merchants organized in a taxonomy of product categories. However, since various merchants and other parties having product information records all store information in various data formats and layouts, collection of information for a product catalog is a tedious and labor intensive task requiring a great deal of manual operations.

SUMMARY OF THE INVENTION

An aspect of the invention is a method of creating a product catalog stored on computer readable media by aggregating product information from a plurality of product information sources having disparate formats for product information and storing the information in a taxonomy. The method comprises processing plural product information records from the product information sources into one or more groups based on which product information records are likely to correspond to the same product, correlating a unique product ID corresponding to the product associated with each of said groups to identify the product, comparing each identified product to categories of a taxonomy to determine a category for the identified products in the taxonomy, and determining attributes for each categorized product based on the product information records corresponding to each group, creating product specifications based on the determined attributes and storing the product specification in the corresponding determined categories of the taxonomy.

BRIEF DESCRIPTION OF THE DRAWING

The invention is described through a preferred embodiment and the attached drawings in which.

DETAILED DESCRIPTION OF THE PREFERRED EMBODIMENT

Figure 1:
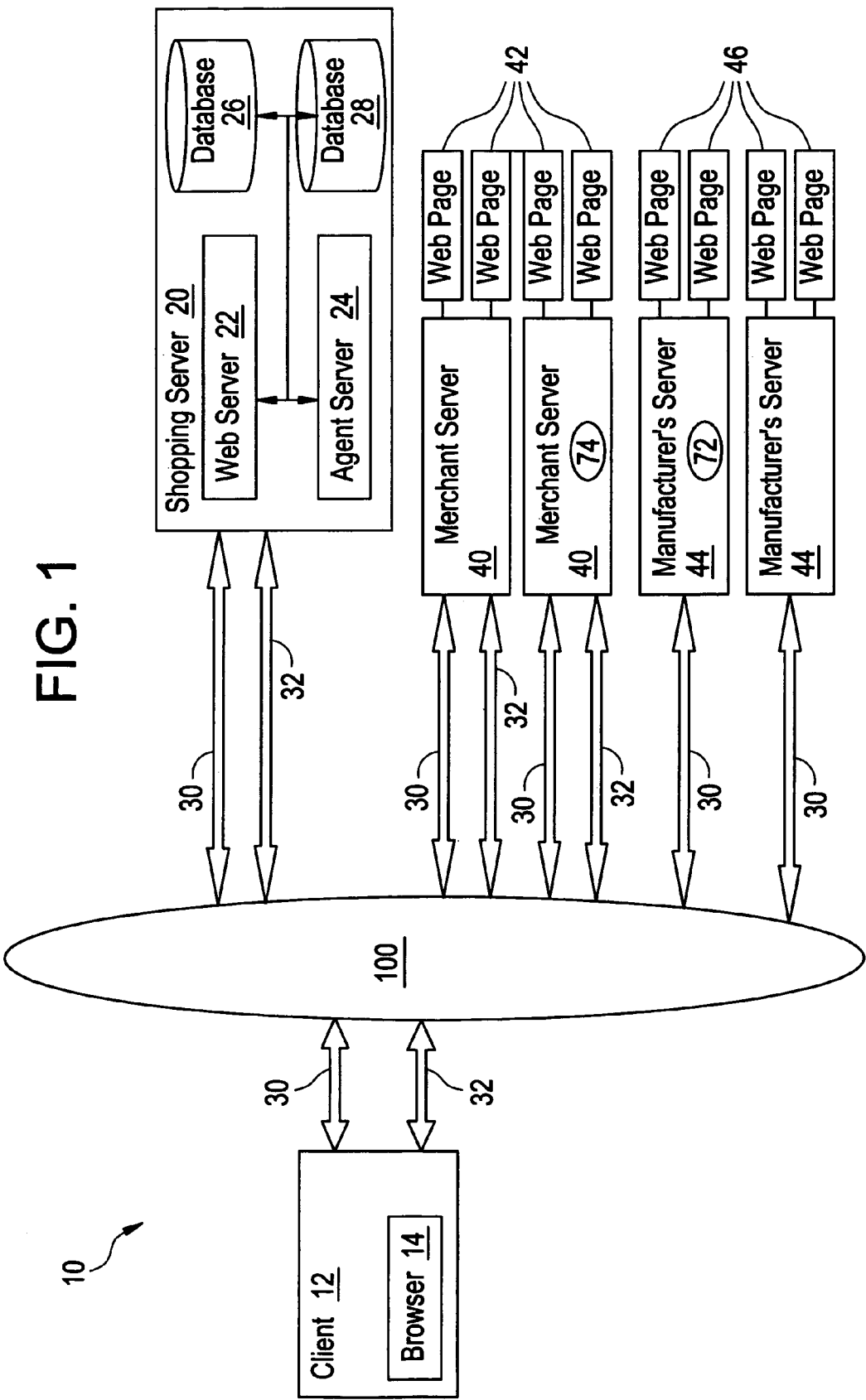
FIG. 1 is a block diagram of a computer architecture in accordance with the preferred embodiment of the invention including a plurality of manufacturers' servers.

A preferred embodiment of a computer architecture for providing an integrated on-line shopping experience and product catalog generation is illustrated in FIG. 1. Commerce system 10 includes client computer 12 executing browser application 14 that supports the HTTP protocol. Client computer 12 is connected, typically through an ISP (Internet Service Provider), to Internet 100 serving as a communication channel. For example, client computer system 12 can be coupled to the ISP via a conventional dial up connection using a modem or through a broadband connection such as ISDN (Integrated Services Digital Network), a cable modem, or a DSL (Digital Subscriber Line) connection. Shopping server 20 is also coupled to Internet 100 in a known manner. Shopping server 20 executes a Web server control application 22, known as an HTTP server application, stored in a memory device. For example, public domain web server software applications from NCSA or APACHE can be used. Shopping server 20 also executes agent server control application 24, (the function of which is described in detail below) utilizing a secure connection for privacy.

A plurality of merchant servers 40 provide on-line shopping using conventional commerce server control applications, i.e. software that runs some of the main functions of an online storefront such as product display, online ordering, and inventory management. Merchant servers 40 and commerce server software are well known and thus are not described in detail herein. Further, merchant servers 40 can store product information records including information about product offerings.

In the preferred embodiment, each of client computer 12, shopping server 20, and merchant servers 40 are capable of communicating using a secure connection protocol, such as SSL or S-HTTP. For clarity, non secure connections 30 and secure connections 32 are illustrated separately. However, typically, these connections will be effected over the same physical connection or communication channel, such as Internet 100. Further, shopping server 20 and merchant servers 40 can have many Web pages stored in memory devices thereof as files in HTML format and/or other formats. Shopping server 20 also includes product catalog 26 and shopper database 28 stored in a memory device thereof as described in detail below.

Client computer 12 can request a display of a Web page stored on shopping server 20 by issuing a URL request through Internet 100 to shopping server 20. For example, a user of client computer 12, i.e. a shopper, can select a product, or plural products, for purchase by navigating Web pages stored on shopping server 20 and populated with product information from product catalog 26. Product catalog 26 can be in the form of a database and can include product descriptions, pricing and other product information for plural merchants and culled from merchant servers 40 using automated Web crawlers as described in detail below. The product information in product catalog 26 should be updated periodically to correspond with current product information on merchant servers 40. However, as will become apparent below, the product information need not be updated in real time.

The product information from product catalog 26 can be searched and displayed by product type, part numbers, price, keywords, or product features in any desirable manner using an interface of shopping server 20 as presented to the shopper by browser application 14 on client computer 12. The product information in product catalog 26 relating to products from plural merchant servers 40 can be displayed side by side in the browser window of client computer 12 to permit the shopper to comparison shop and choose products from any one or more of merchant servers 40 based on the product information. For example, the user may search for all instances of a particular item by product name or part number and may select for purchase the instance from the merchant having the lowest price. Upon logging in to shopping server 20, by entering a username and user id as identification data for example, a user can be identified and thus can avoid the need for reentering previously registered data and preferences.

Figure 2:
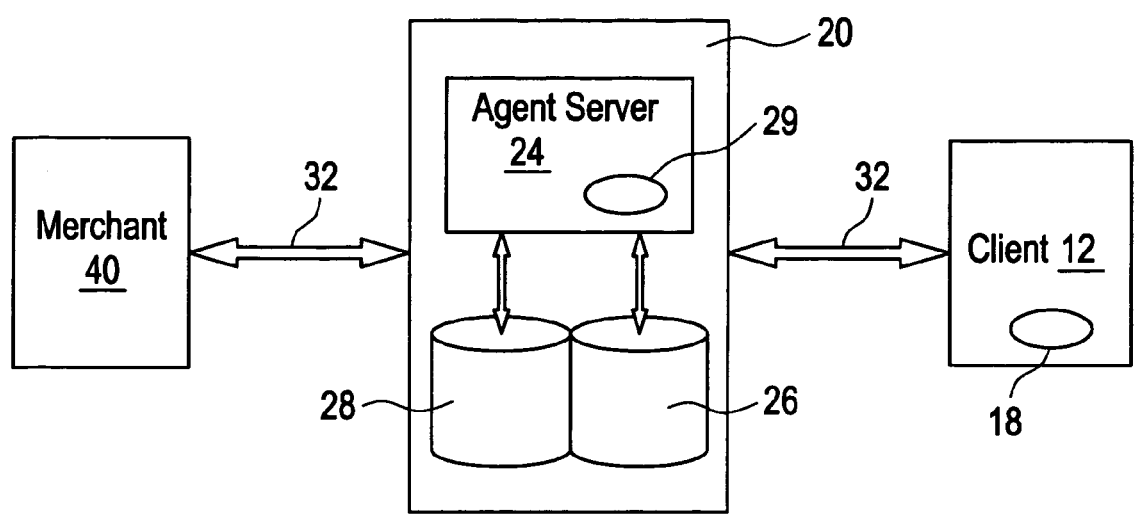
FIG. 2 is a block diagram of a portion of the architecture of FIG. 1 schematically illustrating the communication channel connections for an automated purchase procedure.

FIG. 2 schematically illustrates the communications channel connections of the preferred embodiment during an automated purchasing procedure. For the sake of clarity, the remaining description refers generally to only one merchant server 40. However, it should be understood that the procedure described below can be accomplished for plural products from plural merchant servers 40. When a user selects a product for purchase, by clicking on a "buy" button for example, secure connection 32 is established between client computer 12 and agent server application 24 of shopping server 20. Agent server application 24 then opens parallel secure connection 32 with the commerce server application of merchant server 40. Secure connections 32 are illustrated as direct connections between computers for clarity. However, it should be understood that secure connections 32 can be SSL connections over Internet 100 or any other type of communication channel.

Figure 3:
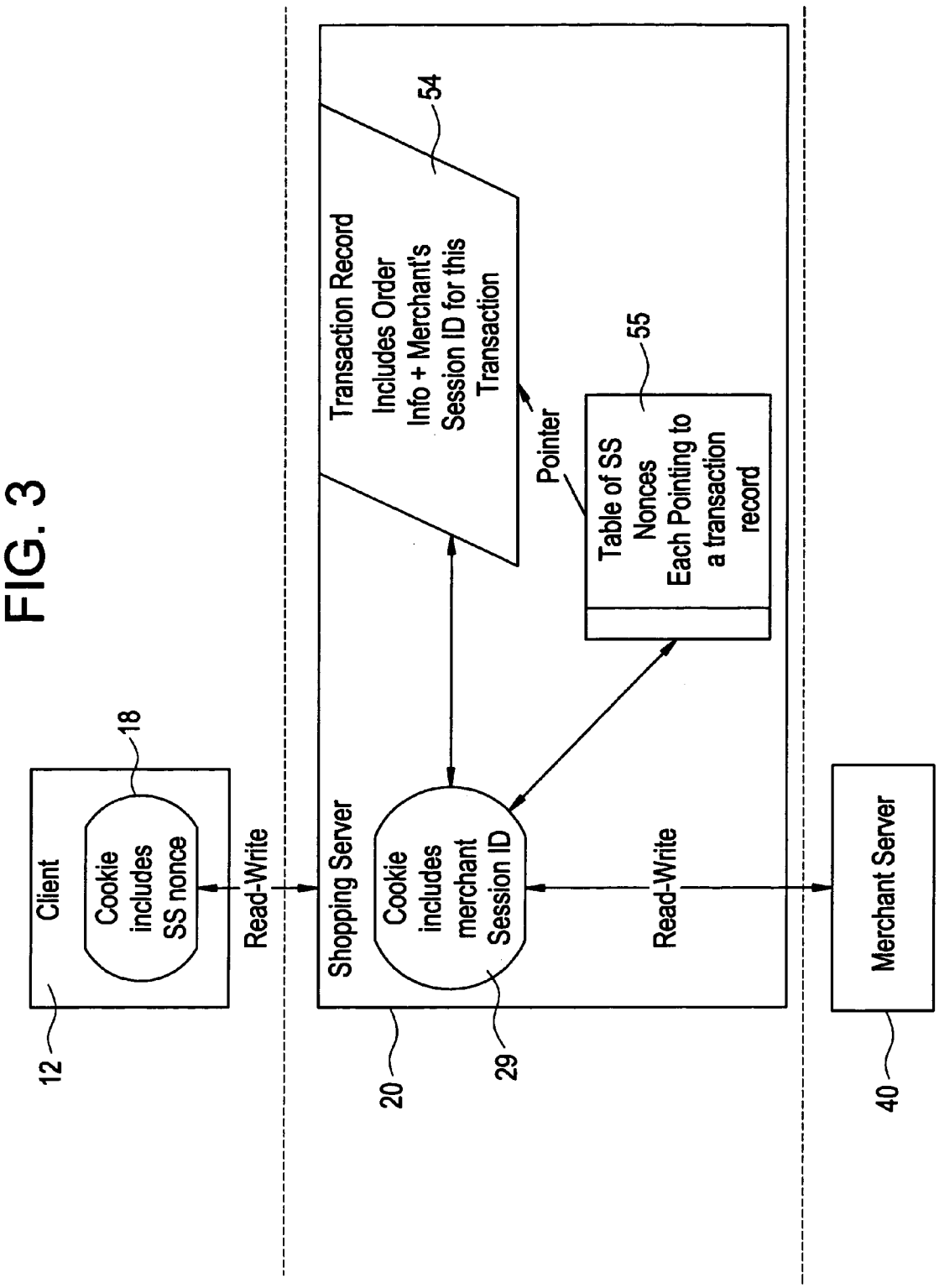
FIG. 3 is a block diagram of the cookie handling procedure of the preferred embodiment.

Also, as illustrated in FIG. 2, first "cookie" 29 (i.e. a file containing information, such as identification information, to be used by a server) is established on shopping server 20 and second cookie 18 is established on client computer 12. First cookie 29 allows merchant server 40 to track status of its order acceptance process and second cookie 18 allows shopping server 20 to track status of its order placement process. With reference to FIG. 3, first cookie 29 contains information identifying the order acceptance session between shopping server 20 and merchant server 40, i.e. a merchant session ID. The identifying information can be any character string or code by which merchant server 40 can identify the order acceptance session. Similarly, second cookie 18 contains a "nonce" (i.e. a one-time random string), or other information identifying the order placement session between client computer 12 and shopping server 20. Shopping server 20 maintains record 55, such as a database or a lookup table, that associates the nonce of second cookie 18 with the corresponding transaction record 54 (see description of FIG. 4 below), by pointing to the transaction record 54 for example. Changes in transaction reporting from merchant server 40 are recorded in transaction record 54 because the two are synchronized by virtue of pointers from the nonces to transaction record 54. Transaction record 54 also contains the corresponding merchant session ID. Accordingly, when the shopper resumes an idle session, such as by confirming an order through client computer 12, shopping server 20 examines second cookie 18 and identifies the corresponding order placement session and status and is thus able to resume the session in a secure manner. Further, shopping server 20 will locate the corresponding first cookie 29 and present it to merchant server 40 to resume the corresponding order acceptance session.

Keep in mind that there typically are a plurality of order placement and corresponding order acceptance sessions occurring simultaneously. The cookie management procedure described above allows all sessions to be correlated properly and thus permits a seamless shopping experience. Shopping server 20 uses information stored in shopper database 28 to act on the shopper's behalf during execution of a buy procedure of merchant server 40. Shopper database 28 can include any appropriate information about registered shoppers, such as their name, address, shopping preferences, credit card numbers, merchant account information (such as a username and user id for the shopper at each particular merchant), and the like. Of course all data in shopper database 28 can be collected during a registration procedure and encrypted for security in a known manner.

Figure 4:
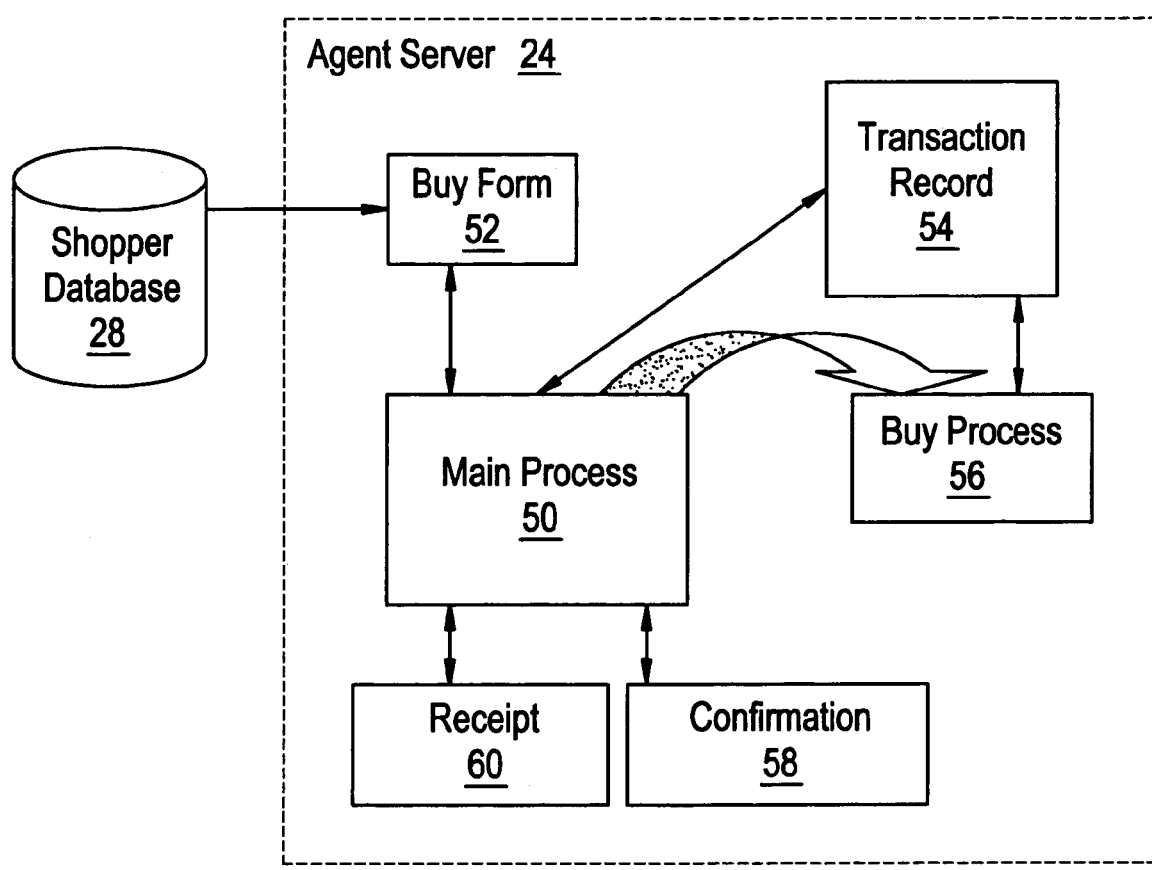
FIG. 4 is a schematic representation of the internal automated purchase procedure of the shopping server of the preferred embodiment.

FIG. 4 illustrates the purchase procedure, i.e. the function of agent server 24, of shopping server 20 in greater detail. Keep in mind that the purchase procedure ordinarily begins after the shopper has logged in to shopping server 20 or otherwise identified themselves uniquely. The first phase of the purchase procedure permits the shopper to search products in catalog 26, browse for products in various ways, and select one or more products for purchase from one or more merchant servers 40. After logging in, main process 50 of agent server control application 24 generates buy form 52 for display to the shopper. In the event that the shopper desires to change information in buy form 52 for the current purchase procedure, the shopper can merely edit buy form 52. For example, the shopper may wish to change the shipping address or shipment method. Of course, the shopper profile can be edited to change the default shopper information in shopper database 28. Buy form 52 is automatically pre-filled with default shopper information corresponding to the shopper if such information exists as a shopper profile in shopper database 28. If such information does not exist for the shopper, the shopper can be prompted to enter the information and the information can be used in the current purchase procedure. Main process 52 also creates transaction record 54 which keeps track of all transaction information, including transaction status, for the current transaction procedure (such as credit card information, billing addresses, and the like from shopper database 28 and merchant SKUs of selected products, shipping options, and the like from product catalog 26).

Also, main process 50 spawns buy process 56 and points buy process 56 to the corresponding transaction record. As the shopper selects various products and options using the browser interface of client computer 12, transaction record 54 is updated. Note that, at any given time, there can be plural purchase procedures for plural shoppers each having a respective buy process 56 and corresponding transaction record 54. Buy process 56 will continue to run in parallel with main process 50 until the purchase procedure is completed. Buy process 56 continually updates transaction record 54 based on shopper selections. Meanwhile, main process 50 polls transaction record 54 for updated status. In this manner, main process 50 is updated with the status of each purchase procedure.

When the first phase of the purchase procedure is complete, i.e. the shopper has selected all desired products and options from all desired merchants, main process 50 presents confirmation page 58 to the shopper, through the browser interface of client computer system 12, for verification of an order by the shopper. Confirmation page 58 is generated by communication between shopping server computer system 20 and the appropriate merchant server 40 using secure connection 32 between shopping server computer system 20 and the appropriate merchant server 40. In particular, shopping server computer system 20 uses the information in transaction record 54 to verify pricing information, shipping information, and other details of the desired purchase with merchant server 40 by automatically going to each merchant checkout page, or other information page, and retrieving the updated information. Buy procedures of merchant server 40 are integrated into buy processes of shopping server 20 to allow buy process 56 to automatically navigate merchant server 40. Back end test scripts or the like can be used to determine the particular buy procedure steps of merchant server 40.

If account information for a particular merchant exists for the shopper in shopper database 28, that account information is used when executing the buy procedures with the merchant server 40. If not, a new account is created for the shopper with the merchant and the account information is stored in shopper database 28 for subsequent use. Since shopping server 20 uses merchant account information that corresponds to the shopper, the shopper can retain preferred buyer points and other benefits and discounts as if shopping directly at merchant server 40.

Keep in mind that, in the preferred embodiment, up to the time of generating confirmation page 58 communication has been between client computer system 12 and shopping server 20 using information from product catalog 26, which might not be entirely updated due to the fluid state of on-line commerce. Accordingly, confirmation page 58 includes real-time pricing and shipping information obtained from merchant server 40 for each selected product in transaction record 54. Upon receiving shopper confirmation of the order summarized in confirmation page 58, all transaction information in transaction record 54 is saved and second cookie 18 is saved to allow the procedure to restart later on with the same user session. Buy process 56 remains idle while waiting for the shopper to confirm the order by selecting a button on confirmation page 58 or taking other action.

In the second phase of the purchase procedure, the purchase transaction is completed. In particular, second cookie 18 is used to resume the previous user session on merchant server 40. Subsequently, the order is executed on merchant server 40 using information in transaction record 54 to run a buy procedure and thus execute a buy process, on merchant server 40. The order is then confirmed on shopping server 20, transaction record 54 is updated and receipt page 60 is generated showing the transaction information and confirmation numbers and the like from merchant server 40. Once again, it is important to note that products can be selected from plural merchant servers 40 and, in such a case, plural buy procedures will be executed and confirmed on the respective merchant servers 40 using the appropriate shopper account information automatically for each merchant server 40.

It can be seen that the purchase procedure discussed above permits shopping server 20 to act on as an agent behalf of the shopper in interactions with merchant servers 40. However, some merchants do not feel comfortable with shoppers using an agent Web site. In particular, many merchants rely on advertising, affiliate programs, and the like in their business model and thus can only accomplish their business objective if the shopper "visits", i.e. directly views, their Web site and its buy pages in particular during shopping. Accordingly, a proxy server mode of shopping server 20 can be used to offer many of the advantages of the integrated purchasing procedure disclosed above, while satisfying vendors that desire to have the shopper visit their Web site buy pages.

Internet proxy servers are well known. The phrase "proxy server" refers generally to a server that sits between a client application, such as a Web browser, and a Web server to intercept requests. The proxy server then serves up substantially the same content as the Web server to which the request was directed while also performing an auxiliary function such as filtering data, monitoring data, or serving up a cached copy of the Web page. In the preferred embodiment, this general concept is expanded and applied to an integrated shopping environment. In proxy server mode, parallel secure connections 32 are set up between client computer and shopping server 20 and between shopping server 20 and merchant server 40, as illustrated in FIG. 2. The first phase of the purchase procedure is accomplished in the same manner as described above with respect to the standard mode. To utilize proxy server mode, merchant database 28 preferably includes form maps for mapping fields in the order forms of merchant server 40 to fields in shopper database 26. An external editing tool can be provided to develop the form maps in a known manner. For example, the editing tool can be configured to read the HTML forms and parse out the data fields. These data fields can then be correlated to corresponding fields in custom database 28.

During the second phase of the purchasing procedure, when client computer 12 requests a Web page from merchant server 40, shopping server 20 (in proxy server mode) handles the request and filters out the HREFs, i.e. HTML document references, and POSTs, i.e. HTML form submissions, to point to shopping server 20 instead of merchant server 40. When merchant server 40 sends a blank form to client server 12, the form is intercepted by shopping server 20 and the form is filled out with information from shopper database 26. When client computer 12 posts a form back to merchant server 40, shopping server 20 reproduces the post keeping intact all changes in the form content made by the shopper. First cookie 29 and the second cookie 18 track the sessions as described above.

In proxy server mode, when the shopper selects a buy button from confirmed page 58 or another page displayed on client computer 12, the shopping cart page, or other buy page, of merchant server 40 is displayed. The shopper manually executes the buy procedure of merchant sever 40 using the interface of merchant server 40 as displayed on client computer 12. This manual procedure is accomplished for each merchant server 40 requiring the proxy mode. Accordingly, in proxy server mode, the shopper views all the buy pages and executes the buy procedures on merchant server 40. However, shopping server 20 mediates and assists in filling out forms. Other aspects of the purchase procedure using proxy server mode can be similar to the purchase procedure described above without proxy server mode.

The invention facilitates on-line commerce by permitting an integrated buying experience from plural merchants. The invention can be implemented over any type of communications channel, such as the Internet, a local area network (LAN), a wide area network (WAN), direct computer connections, or the like, using any type of communication hardware and protocols. Any type of hardware or combination of hardware can be used for the various clients and servers. Accordingly, the term "computer" as used herein, refers to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used herein refers to any collection of information such as a database file, a lookup table, or the like.

As noted, product catalog 26 can include product descriptions, pricing, delivery dates, and other product information for plural merchants. Such product information may be culled from product information records of various sources by using automated crawlers as described below and updated periodically to correspond with current products available on merchant servers 40. The term "crawler" as used herein refers to any software that performs searches of content over a network and can include "bots", "robots", "automated site searchers" and the like. Referring again to FIG. 1, commerce system 10 includes client computer 12 executing browser application 14 and shopping server 20 which executes agent server control application 24, client computer 12 and shopping server 20 being connected to Internet 100 which serves as a communication channel. In addition, in the preferred embodiment, plurality of manufacturer's servers 44 are also connected to Internet 100 via non secure connections 30. In this regard, shopping server 20 may be used to aggregate product information from a plurality of sources connected to Internet 100 regarding products of a product category and store the aggregated information in product catalog 26 in the form of a taxonomy. However, it should be noted that the aggregation of product information may be attained using a computer that is separate from the computer running agent server central application 24 and the resulting information can be made available to the computer running agent server central application 24.

Figure 7:
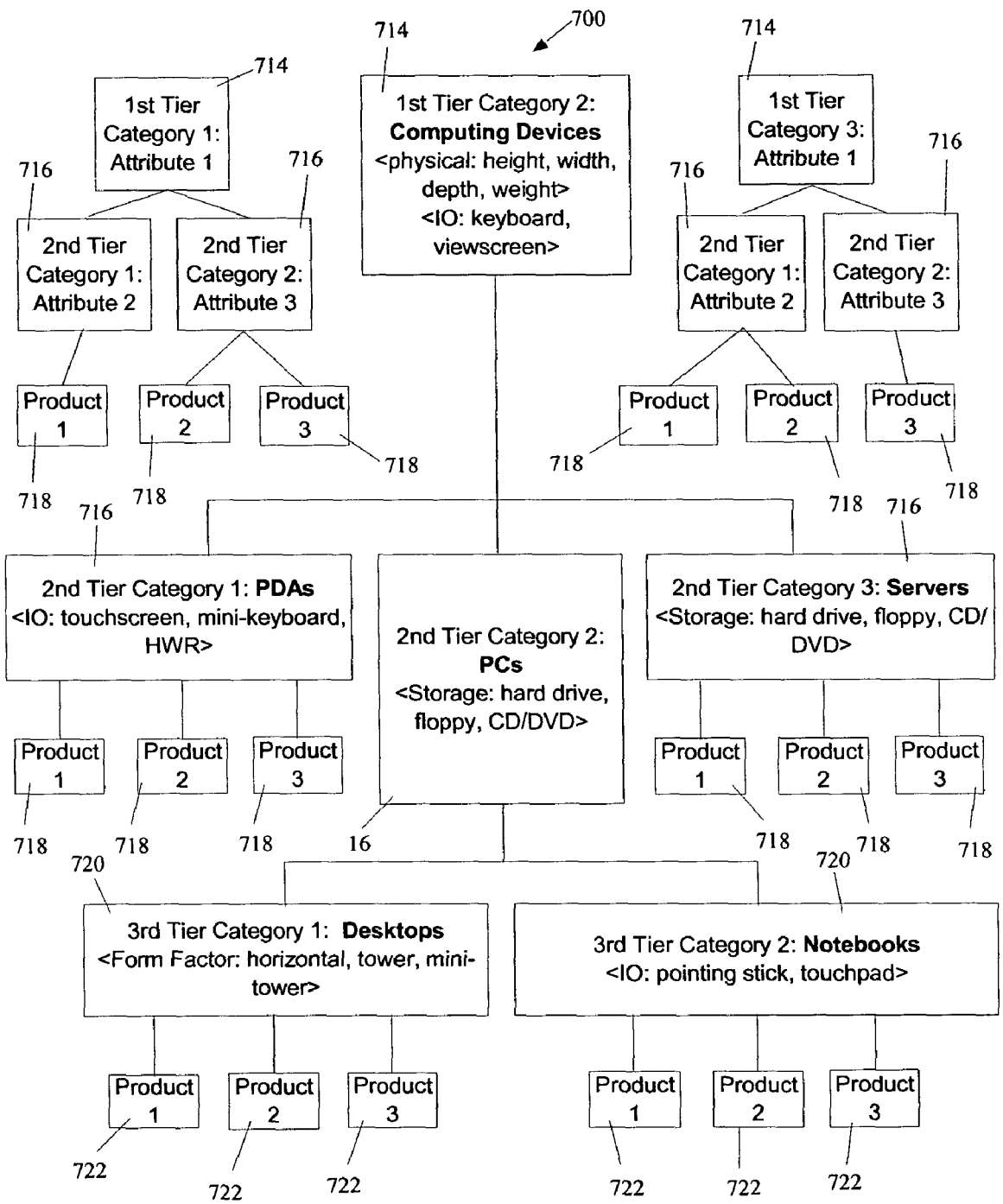
FIG. 7 is a schematic illustration of a catalog taxonomy of the preferred embodiment.

FIG. 7 illustrates an example of taxonomy 700 of product catalog 26. Taxonomy 700 includes $1^{st}$ tier categories 714, $2^{nd}$ tier categories 716, $3^{rd}$ tier categories 720, and product specs, i.e., specifications, 718 and 722. Note that taxonomy 700 is defined by a tree-like structure in which categories include attributes that define a spec for products within the categories. Product spec 718 and 722 inherit the attributes of the parent category and can include values for the attributes and applicable units of measure.

The plurality of sources may include a plurality of merchants' information sources and manufacturers' product specification sources that are hosted in merchants' servers 40 and manufacturer's servers 44 respectively. It should be appreciated that in the preferred embodiment, the plurality of merchants' information sources are merchants' Web pages 42 and the manufacturers' product specification sources are manufacturers' product specification Web pages 46. Additional sources of product information records can be various product literature sources which may be product literature Web pages that review and provide additional information regarding a product or products of a product category. In fact, the manufacturers' product specification sources can be considered to be merely a subset of the product literature sources. Also, when manufacturer's sell products directly over Internet 100, manufacturer's servers 44 are one in the same as merchant's servers 40.

In accordance with the preferred embodiment, the shopping server 20 is operative to provide at least one crawler for visiting the plurality of sources hosted by, for example, merchants' servers 40 and manufacturer's servers 44 to aggregate product information from these plurality of sources regarding various products of a product category. The crawler may include product literature crawler 72 that gathers product phrase information from the manufacturer's product specifications Web pages hosted by manufacturer's server 44. The crawler may also include product offerings crawler 74 that gathers product phrase information and pricing information of each of the products in the product category from the merchant's Web pages hosted by merchant's servers 40. Of course, it should also be noted that product literature crawler 72 may also visit merchant's Web pages and product offerings crawler 74 may also visit manufacturer's product specifications Web pages. Moreover, a single crawler may be provided to perform the functions of both product literature crawler 72 as well as product offerings crawler 74. Any type of number of crawler can be used.

In the preferred embodiment, product literature crawler 72 and/or product offerings crawler 74 may gather information form product catalog 26 regarding a manufacturer's identity and product model, as well as the product phrase information which preferably includes a phrase and at least one characteristic of the phrase from each of the plurality of sources by utilizing computational linguistics. It should be understood that the term "phrase" which is gathered by crawlers 72 and 74 refers to an alpha-numeric character string or strings present in a source such as manufacturer's product specifications Web pages 46, merchant's Web pages 42, and/or product literature Web pages (not shown). The term "characteristic" refers to some attribute of the alpha-numeric character string in the Web page. For instance, the characteristic of the phrase may be its frequency, location, font size, font style, font case, font effects, and font color of the phrase in the Web page as well as the frequency of collocation (phrases immediately next to each other) and co-occurrence of phrases (phrases within a predetermined words of each other). Moreover, the term "computational linguistics" is used herein to refer to a cross-disciplinary field of modeling of language utilizing computational analysis to process language data such as any of the above noted characteristics of the phrase. In the preferred embodiment, crawlers 72 and 74 and the computational linguistics used thereby are software programs designed to execute the functions described. Thus, by utilizing computational linguistics, product literature crawler 72 and/or product offerings crawler 74 gathers product phrase information which may be processed and used in the manner described below.

Figure 5:
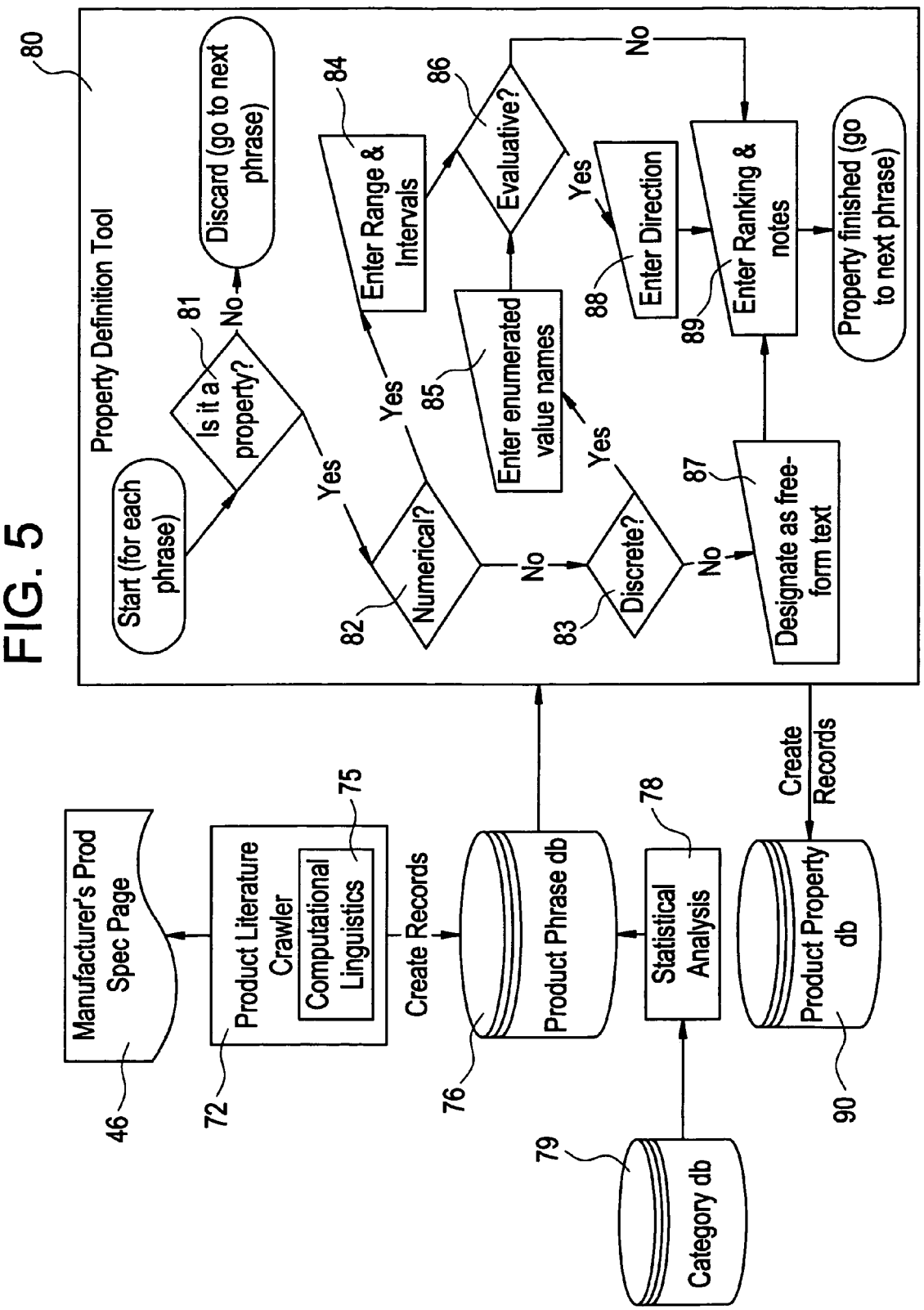
FIG. 5 is a block diagram of a method in accordance with one embodiment of the present invention for processing the gathered product property information from the plurality of manufacturers' servers.

In accordance with the above discussion, FIG. 5 illustrates the method of the preferred embodiment of the present invention where product literature crawler 72 obtains product phrase information utilizing computational linguistics module 75. The obtained product phrase information (i.e. the phrase and the characteristic of the phrase) are then stored in product phrase database 76 for further analysis. Commerce system 10 of FIG. 1, via shopping server 20 or by other means such as another computer/server, is operable to further analyze the product phrase information using statistical analysis module 78 to thereby provide a ranking of the product phrases in any given product category. These ranked product phrases will typically represent commonly found product properties of a given product or product category and are also stored in the product phrase database 76.

In addition, as will be described in farther detail below, the preferred embodiment of the present invention utilizes property definition tool 80 to analyze the stored product phrase information to thereby determine whether each of the product phrase information in product phrase database 76 is in fact a product property. It should be understood that the term "product property" or "product properties" can be a word, number, phrase, or combination thereof, that descriptively characterizes the product or product category. Property definition tool 80 of the preferred embodiment is a software algorithm, running on shopping server 20 or another device, illustrated as steps in FIG. 5.

Thus, for example, product literature crawler 72 may examine the content of Web page 46 of manufacturer's server 44 such as a computer manufacturer (or other server having a product literature source) to obtain product phrase information provided on the Web page including the phrase and the characteristic(s) of the phrase as well as information provided in the Web page's URL address and any meta tags. This product phrase information can then be stored in product phrase database 76 for further analysis. In this example, the computer manufacturer's home Web page will likely have a meta tag including the phrase "computer" as well as the phrase "computer" throughout its home Web page which may or may not have special characteristics such as formatting and positioning which distinguishes the phrase from the remainder of the text on the Web page. Because of the use of computational linguistics module 75, product literature crawler 72 is able to recognize and obtain such information regarding the phrase "computer" such as its presence in the home Web page's meta tag, frequency in its home Web page, and its other special characteristics to thereby statistically discern that the home Web pages relates to computers and that the Web pages linked to the home Web page will also likely relate to computers and consequently, determine that this phrase is a product property, in particular, a product category.

More preferably, product literature crawler 72 may also crawl through a substantial portion of the linked Web pages prior to determining whether the phrase is a product property to ensure accurate determination. For instance, product literature crawler 72 may crawl through the plurality of Web pages linked to the home Web page to gather product phrase information and in the present example, will further likely identify presence of the phrase "computer" as well as other phrases known to be associated with a given product category such as phrases "Mb RAM" which is a collocated phrase, "MHz", "floppy", and/or "Gb", etc. Based on analysis of the frequency and characteristics of such phrases by statistical analysis module 78, the phrase "computer" can be determined to be a product property that defines a product category. In this regard, separate category database 79 may be provided with various product categories and the likely associated key word phrases which may be cross referenced to ensure the accuracy of the product category determination. Furthermore, in addition to, or as an alternative to category database 79, a human verification process may be provided to further ensure accuracy of the product category determination.

In addition, the plurality of Web pages linked to the home Web page will also typically include alpha-numeric character strings, i.e., data strings, that identify other important characteristics of the product or product category. Again, it should be noted that such significant character string will often be distinguished from the remaining text of the Web page by its location on the Web page, formatting or other characteristic of the character string. For instance, the character strings may be positioned near the top or the left hand side of the Web page and have a larger font size than most of the other character strings on the Web page. In this regard, such significant character strings may have a prominent font size, font style (such as bold), or font effects (such as italicizing and/or underlining), etc. Referring to the present examples of computers, important attributes/characteristics of computers such as its speed and capacity are likely to be indicated by a numeric string followed by phrases such as "Mb RAM", "MHz", "Gb", etc. Because of the use of computation linguistics module 75, product literature crawler 72 is able to recognize and obtain the phrase and characteristic(s) of the phrase, such as its frequency, location, font size, font style, font case, font effects, font color, collocation or co-occurrence as product phrase information. Such information can be retained in product phrase database 76 and statistical analysis module 78 can then be used provide a ranking of the phrases in any given product category and also stored in product phrase database 76. In particular, statistical analysis module 78 will recognize that a particular phrase was emphasized by the presence of one or more characteristic(s) and consequently, provide a higher ranking for the particular phrase than other phrases that do not have a characteristic associated with it.

In the preferred embodiment of the illustrated invention, the ranked listing of the phrases in product phrase database 76 can then be further analyzed by property definition tool 80 to determine whether the phrases in the product phrase information are in fact relevant product properties that descriptively characterize the product or product category. It should be noted that, preferably, property definition tool 80 is executed by a human editor so that common sense judgments can be made relative to the ranked phrases which were generated utilizing a computer and statistical analysis module 78. However, a computer or other logic device may be used to automate/semi-automate the function of property definition tool 80.

As can be seen in FIG. 5, the determination of whether the phrases in the product phrase information are product properties is executed in step 81, preferably by a human editor. If the phrase is determined to be not a relevant product property, the phrase and the product phrase information is discarded and the next phrase is analyzed. If the phrase is determined to be a product property (i.e. the phrase descriptively characterizes the product or product category), a determination is made as to whether the phrase is a numeric character string as shown in step 82. For instance, in our example of computers, exemplary numeric phrases would be the numbers quantifying RAM, hard drive capacity, processor speed, etc. If the phrase is numeric, a range and interval may be entered if appropriate and recorded for the corresponding numeric phrase in step 84. For instance, relative to RAM, the computer model may be available with 32, 64, 96 or 128 Mb of RAM. In this case, the range would be 32 to 128 Mb and the interval would be 32 Mb.

Then, a determination is made as to whether the numeric phrase is evaluative as shown in step 86, i.e. the numeric phrase is indicative of a quality of the product and/or impacts the desirability of the product. As can be readily appreciated, the number associated with RAM is evaluative because the amount of RAM directly impacts the capacity and desirability of the computer. If the numeric phrase is evaluative, the direction of evaluation is determined as shown in step 88, i.e. whether a higher value is better or a lower value is better. Again, referring to our example, computers with a higher amount of RAM are more desirable than computers with less RAM and thus, a higher value is better and the direction of evaluation is better as the numeric phrase value increases. The direction can be determined manually by a human editor or automatically via a computer or other device by correlation to price for example. Of course, in certain product properties that are numeric and evaluative, a lower value may be better. For instance, a lower value in the weight of a notebook computer would be more desirable than a higher value. Correspondingly, the direction of evaluation facilitates ranking of each of the phrases as shown in step 89. Thus, the numeric phrase "32" would be ranked lower than "64" etc. at least with respect to the product property of RAM. If the numeric phrase is not evaluative, the human editor may enter a ranking for the numeric phrase based on his/her product knowledge and experience in step 89 and the next phrase may be analyzed. Of course, because such a numeric phrase is not evaluative, the ranking for the phrase will likely be low as compared to evaluative numeric phrases.

Referring to the above step 82, if the phrase is not numeric, a determination is made whether the phrase is discrete in step 83 and the enumerated value names for discrete phrase is entered in step 85. For instance, relative to the present example, the phrases "CD-ROM", "CD-R" and "CD-RW" are all discrete phrases that are also properties of a computer. It is then determined whether the discrete phrase is evaluative in step 86. As can be appreciated, these discrete phrases are evaluative in that they are indicative of a quality of the product and/or impact the desirability of the product since each of these CD memory devices provide different level of functionality to the computer as known in the computer arts. In this regard, property definition tool 80 then enters the direction of evaluation as shown in step 88 and enters the ranking of the discrete phrases and correspondingly ranks the products as shown in step 89. In the present example, the phrases "CD-ROM", "CD-R" and "CD-RW" are in the order of desirability in a computer as appreciated in the computer arts. Once again, the order or ranking can be determined manually or automatically. Moreover, if the discrete phrase is not evaluative, then a ranking for the discrete phrase is entered in step 89 and the next phrase is analyzed. Of course, because such a discrete phrase is not evaluative, the ranking for the phrase will likely be low as compared to evaluative discrete phrases.

Lastly, if the phrase is neither discrete nor numeric, then the phrase is designated as free-form text as shown in step 87, a ranking is entered as shown in step 89 and the next phrase is analyzed. Such free-form text would be relatively rare since the phrase was deemed to be a product property. In certain products however, such free-form text may be desirable and add value to the product or undesirable and diminish the value of the product. For instance, an autograph or inscription on a product may be considered as free-form text which would add value to the product.

In the preferred embodiment of the present invention illustrated in FIG. 5, once the analysis as shown in property definition tool 80 is completed on the product phrase information stored in product phrase database 76, the resulting product properties (i.e. phrases that descriptively characterize the product or product category) are stored in a product property database 90. In addition, by executing property definition tool 80, these product properties that are stored in product property database 90 and are also ranked in order of significance in the product or product category. Thus, in the above examples of computers, product property database 90 will have a record of product properties such as MHz, Mb RAM, Gb, CD-ROM, CD-R, CD-RW, etc. as well as many other product properties and attributes relevant for evaluating a computer. Moreover, through the execution of property definition tool 80, these product properties are ranked as well. As will be discussed in further detail below, these stored product properties of the product property database may then be retrieved and used to create catalog 26 for use in evaluating products that are available from various merchants on their respective merchant's Web pages to thereby provide a single shopping interface which seamlessly integrates plural on-line merchants to thus facilitate comparison shopping in an on-line environment.

Of course, it should noted that whereas the above aspects of the present invention have been described as applied to computers, the present invention is not limited thereto and computers were merely selected as an example of how product literature crawler 72 and property definition tool 80 may be used. In this regard, it should be appreciated that the present invention may be applied to all different products and services that can be effectively marketed on a networked environment such as Internet 100. Thus, the present invention may be applied to all goods as well as many services including insurance, financial services, rentals, lodging, transportation, vacation packages, etc. in a manner similar to that discussed above.

Figure 6:
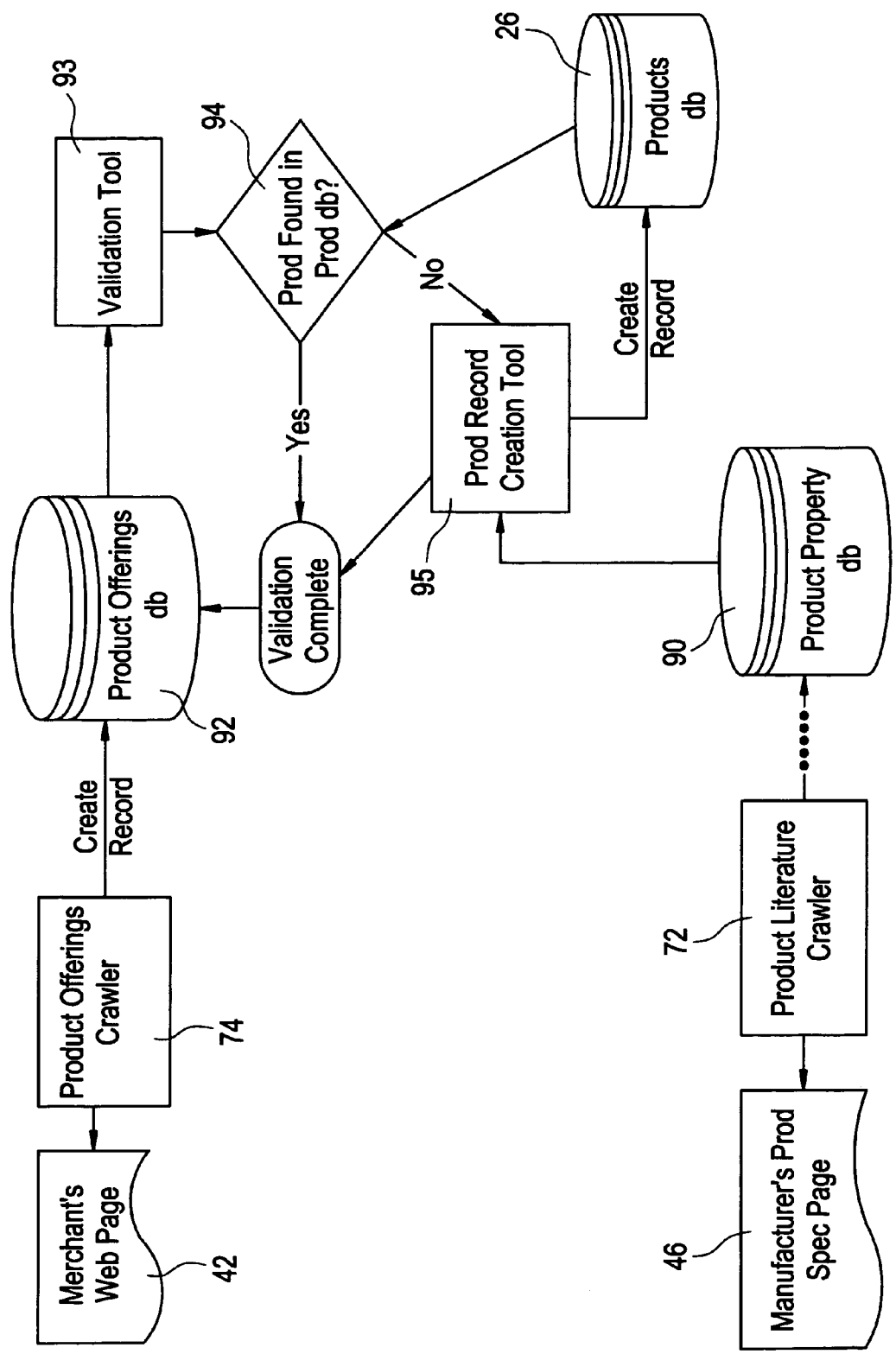
FIG. 6 is a block diagram of a method in accordance with one embodiment of the present invention for validating the product offerings of on-line merchants and for creating a new product record based on the determined product properties.

FIG. 6 shows a block diagram of a method in accordance with the preferred embodiment of the present invention for validating the product offerings of on-line merchants and for creating a new product record based on product properties. As can be appreciated, the lower portion of FIG. 6 provides an abbreviated illustration of FIG. 5 which was discussed in detail above which primarily explained the method for determining product properties as gathered from manufacturer's product specification Web pages 46 and other sources by product literature crawler 72. In a similar manner, product phrase information may be gathered from the merchant's information source such as the merchant's Web page 42 by product offerings crawler 74 which may also be generated by shopping server 20. Thus, like product literature crawler 72, product offerings crawler 74 gathers product phrase information from merchant's Web page 42 including a phrase and at least one characteristic of the phrase utilizing computational linguistics module (not shown). Again, the characteristic of the phrase may be its frequency, location, font size, font style, font case, font effects, and font color of the phrase in the Web page as well as the frequency of collocation and co-occurrence of phrases.

In addition, because each merchant will likely offer various models of more than one manufacturer, product offerings crawler 74 also obtains information regarding product model and manufacturer's identity. Moreover, because each of the products may be purchased through a particular merchant at a specified price as designated by the particular merchant, merchant identity information such as the merchant's URL, and price information for each of the offered products are also gathered by product offerings crawler 74 so that information regarding the product, price, and the identity of the merchant offering the product at a given price are all correlated to one another. All of the above described gathered information is stored into product offerings database 92. The details of how the manufacturer's identity, product model, product phrase information, merchant identity information and the pricing information are all gathered is substantially similar to the method described above relative product literature crawler 72 of FIG. 5 and thus, are omitted here to avoid repetition. However, based on the teachings above, it should be clear to a person skilled in the art how such information can be gathered utilizing product offerings crawler 74 and be saved in product offerings database 92 and used to create product catalog 26.

Thus, in correspondence with the computer example used above, products offerings crawler 74 may visit various Web pages of computer merchants to gather all the required information regarding every make and model of computers offered in computer merchant's Web page 42 as well as the merchant identity information such as the merchant's relevant URL. This information is stored in product offerings database 92 in a uniform format for further processing.

In accordance with the preferred embodiment of the present method as shown in FIG. 6, once the above noted information is gathered and stored in product offerings database 92, it is validated using validation tool 93 to match the various merchant offerings to the product information stored in products catalog 26 in shopping server 20 shown in FIG. 1. As described previously, the products catalog 26 on shopping server 20 stores product information such as product descriptions, pricing, and other product information for plural merchants which may be culled from merchant servers 40 using automated product offerings crawler 74. Shopping server 20 accesses and presents the product information stored in products catalog 26 to client computer 12 to thereby provide a single shopping interface with seamlessly integrated plural on-line merchants to thereby facilitate comparison shopping in an on-line environment.

For each given product offering in product offerings database 92, products catalog 26 is searched to determine if there is a corresponding match present in products catalog 26 as shown in step 94. If there is such a match, the validation is deemed to be completed for the particular product offering and another product offering in product offerings catalog 92 is selected for validation via validation tool 93. It should be noted that validation tool 93 may preferably be executed by a human editor who accesses via a computer or other means, product catalog 26. However, validation tool 93 may also be executed by a computer or other automated device.

If however, a corresponding match in products catalog 26 is not found, product record creation tool 95 may be executed to update products catalog 26 with the new product offering found in product offerings database 92. In this regard, product property database 90 as described previously is accessed to provide the ranked product properties of a product or product category to product record creation tool 95. These ranked product properties which were obtained via product literature crawler 72 can be then used to create a record on products catalog 26 for the new product offering found in product offerings database 92 thereby ensuring the obtaining of the important product properties for the new product offering. It is again noted that the product record creation tool 95 may preferably be executed by a human editor. However, product record creation tool 95 may be executed by a computer or other automated device.

Correspondingly, referring again to the computer example, the ranked product properties which were processed via product definition tool 80 and stored in product property database 90 can be provided to product record creation tool 95 so that all of the important product properties for the new product offering are obtained and entered into product catalog 26 when a new record is created. These product properties will include MHz, Mb RAM, Gb, CD-ROM, CD-R, CD-RW, etc. as well as many other product properties and attributes stored in the product property database 90 which are relevant for evaluating a computer. Of course, again, it is noted that application to computer sales were merely selected as an example and that the present invention may be applied to all different products and services that can be effectively marketed on a networked environment such as the Internet 100.

Thus, in this manner, the present invention also allows new product offerings available in the marketplace to be easily integrated into the products catalog 26 thereby periodically updating products catalog 26 to ensure accurate offering of newest products and prices to client computer 12. However, as can now be appreciated, because the updating is attained via product offerings crawler 74, the product information is not updated in real time, but rather periodically in the background of shopping server 20. The product information on products catalog 26 can be used to display products available for purchase by product type, part numbers, price, keywords, or product features in any desirable manner using an interface of shopping server 20 as described previously. The product information can be displayed side by side in the browser window of client computer 12 to permit the shopper to comparison shop and choose products from any one or more of merchant servers 40 based on the product information. Once the shopper has selected all desired products and options from all desired merchants, the shopper can complete the shopping and "check out" as described previously by confirming the order which verifies pricing information, shipping information, and other details of the desired purchase.

It is again noted that in the above described embodiment, property definition tool 80, validation tool 93 and product record creation tool 95 are preferably executed by a human editor utilizing a computer or other device so that their execution is semi-automatic. Because of the present invention provides these distinct tools with distinct functions, human editors having different skills and knowledge can be utilized for each of the tools. For instance, it takes a relatively lower level of skill and knowledge to execute validation tool 93 and product record creation tool 95, whereas it takes a higher degree of skill and knowledge to execute property definition tool 80. Therefore, this embodiment allows efficient human resource management since the tools and their respective functions are preferably separated and more experienced human editors can be assigned to execute property definition tool 80 and the less experienced human editors can be assigned to execute the other tools. Of course, it should also be appreciated that in alternative embodiments, the above noted tools may be combined in part or in total and can also be executed automatically via computer or other device so that use of human editors is not necessary.

Figure 8:
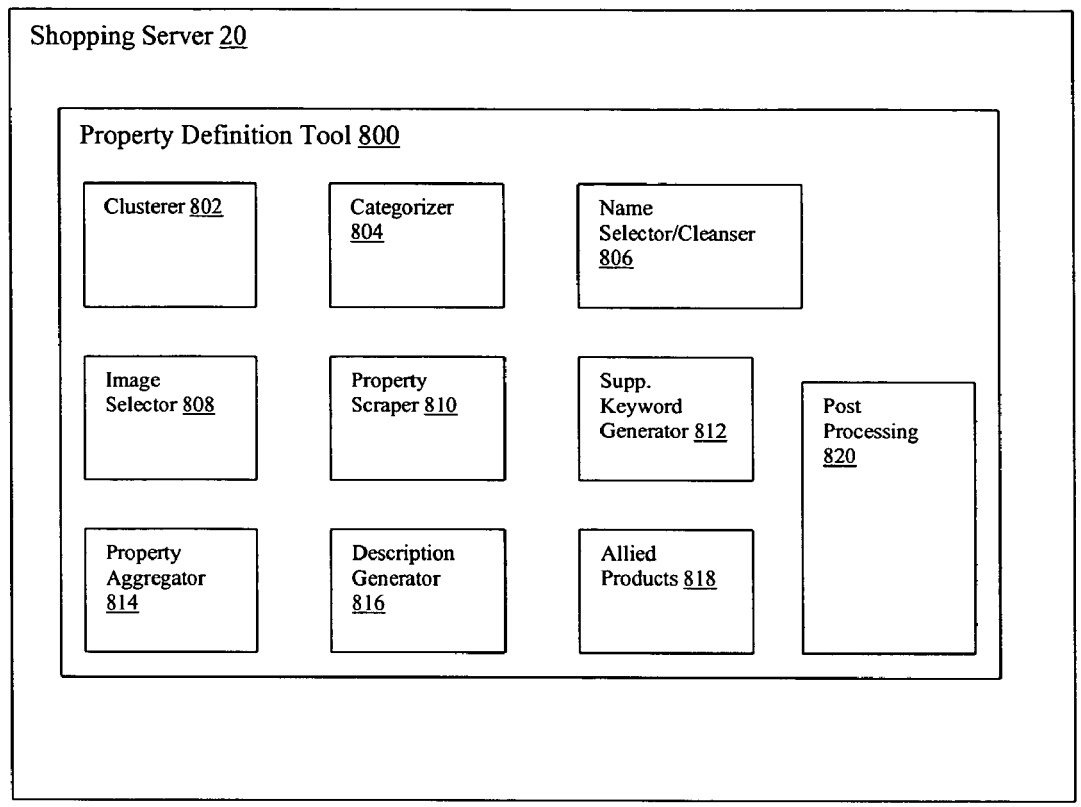
FIG. 8 is a schematic illustration of a property definition tool of another preferred embodiment.

Another embodiment of the invention is illustrated in FIG. 8. The embodiment of FIG. 8 includes a property definition tool that is adapted to aggregate product information from plural sources, such as merchant servers 40 and manufacturers servers 44, to produce a product catalog 26 in a highly automated manner. Property definition tool 800 can be in the form of software running on a general purpose computer, such as shopping server 20 in the embodiment of FIG. 8. Property definition tool 800 includes clusterer module 802, categorizer module 804, name selector/cleanser module 806, image selector module 808, property scraper module 810, supplemental keyword generator module 812, property aggregator module 814, description generator module 816, allied products discovery module 818, and post-processing module 820.

Figure 9:
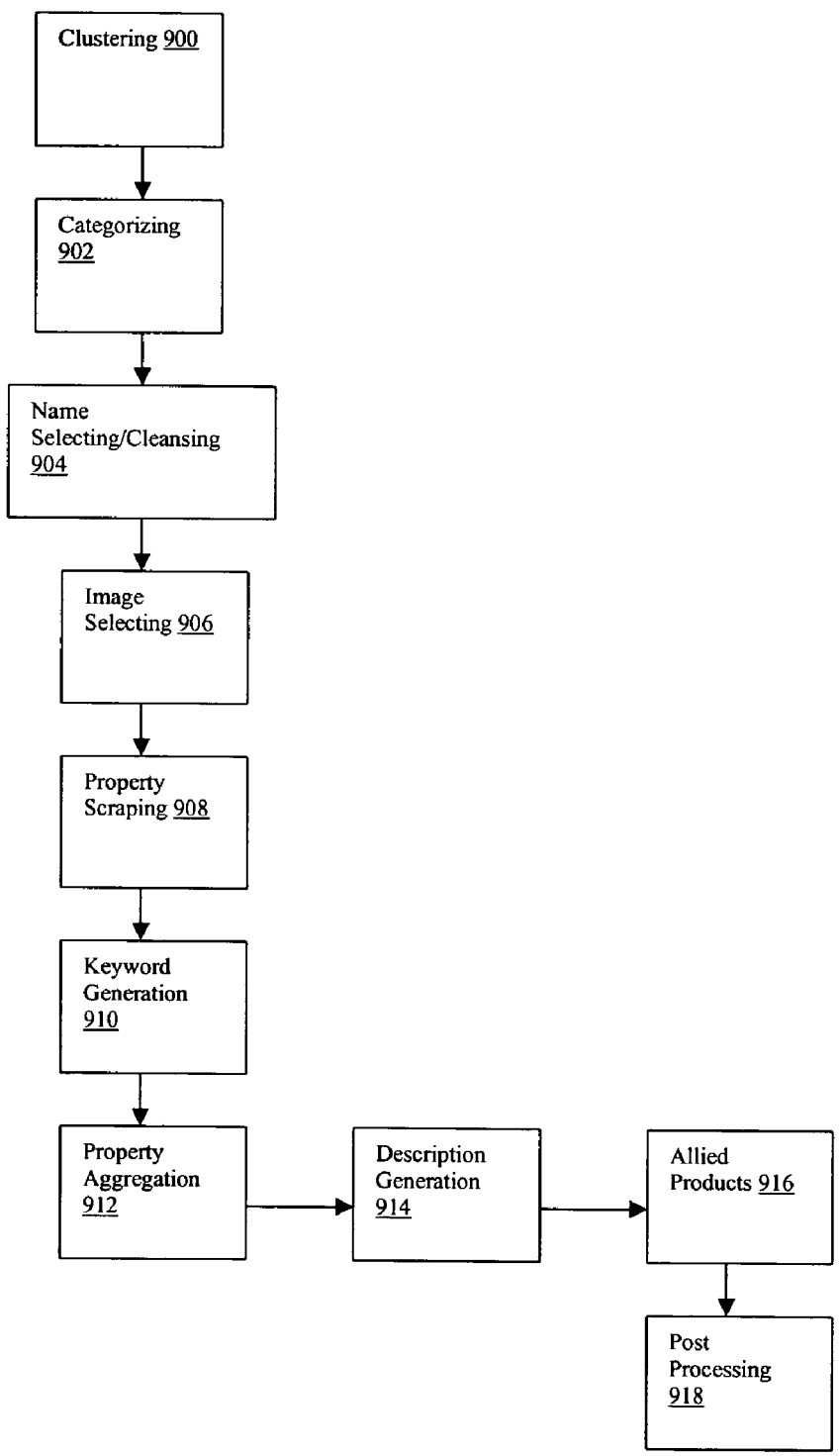
FIG. 9 is a flowchart of the operation of the property definition tool of FIG. 8.

FIG. 9 illustrates a flowchart of the high level function of property definition tool 800 of preferred embodiment. Each step of FIG. 9 will be described in greater detail below. In step 900, clusterer module 802 analyzes merchant offerings from plural product information records, such as records stored on merchant servers 40, and clusters, i.e., groups, them according to which are most likely to be the same product, and assigns or creates a UPID (Universal Product ID) for each. Of course, the product information can be gathered from product information records using a crawler, such as literature crawler 72 described above. In this embodiment, the crawler can retrieve product information records in their entirety for automatic processing by property definition tool 800.

In step 902, categorizer module 804 places each UPID into a category in a product catalog taxonomy based on a comparative analysis of that product with other products already classified in categories of the taxonomy. The determination of product catalog taxonomies is generally well known. In step 904, name selector/cleanser module 806 selects the best among multiple variant names for the product found in the product records of a group, and then cleanses the name of any superfluous inserted or concatenated text that is commonly found in the name field of products. It also then builds an optional, longer name that is of a consistent style and has only the most relevant content for the specific category in question.

In step 906, image selector module 808 chooses the most preferable product image from all various product information records in a group, based on size, type, quality, proportion, reliability of source, and other factors. In step 908, property scraper module 810 scrapes normalized attributes values for each product from every available product information record and supplies confidence ratings to every act of scraping that it performs. In step 910, supplemental keyword generator module 812 repeats a process similar to that of step 908, but with reference to open-ended keywords for each group, rather than for normalized attributes.

In step 912, property aggregator module processes the output of property scraper module 810 by employing a weighted voting engine to merge the many scrapings and determine a final value for each attribute of each product. Also, in step 810, the supplemental keywords are normalized based on one of various algorithms.

In step 914, description generator 816 composes short texts describing each product. Such texts are non-evaluative and are based on templates using the attribute values attained in steps 810 and 812. For example, this can be accomplished by randomly selecting one of a number of description templates that can be instantiated by reference to the most important properties of the product, and then executing minor word or phrase variation to avoid monotony. A final step ensures proper sentence formatting, punctuation, and capitalization.

In step 916, allied products module 818 recognizes related allied products, such as accessories, parts, connectors, etc., and the bundles or kits that can be comprised of a set of allied products. Any items falling below confidence thresholds, can be handled specially, either manually or automatically, in various ways. Allied products module 818 is described in greater detail below.

Clustering, accomplished by clusterer module 802, is the process of grouping together various merchant offerings, which have no ready-to-hand UPID, and creating a new UPID for each group. This process results in a one-product-to-many-prices relationship. Numerous features can be extracted from merchant offer records, manufacturer records, distributor records, and other records describing products (collectively referred to as "product information records" herein) in order to enable clustering.

Clustering can be run per manufacturer, i.e., the "primary key" of the process can be the manufacturer name. Thus the first problem to be solved is determining that different forms of reference to the same manufacturer are indeed the same. The risk of accidentally clustering products of different manufacturers is slight, but when it does happen, it can be a very critical error, and therefore it is important for the system to avoid this error. The system does so largely by discovering patterns in manufacturer part numbers and model identifiers. Note that this presumes that the manufacturer is already separated out of the product name, which is not always the case—some product information records include the manufacturer or brand name as part of the product name field. Hence, a first pass may be required to populate the manufacturer name field for use in clustering.

Once the manufacturer (or brand) name is discretely obtained, clusterer module 802 is given this name as a data string that it uses in a sub-string search in order to select all product information records where the manufacturer name begins with this sub-string. For example, clusterer module 802 may be started over the space of product offerings with manufacturer names starting with "bell". This will define the data set for the process as selected product offerings with manufacturer strings such as "Bell Atlantic", "Bell Industries, Inc.", "and Bell Microproducts". These names are normalized (removal of irrelevant parts such as "Inc." and "Corp."), and further words are removed from the end until the minimum manufacturer name is found from the catalog that matches one manufacturer name from the catalog. As an example, there can be plural different names among data providers today that are all ways of saying "Sony," and thus it requires more work in order to decide which of the plural "Sony-like" manufacturer names should be used as "canonical". The system may use any manufacturer aliases from the various data sources, and in addition, aliases may be inferred as the catalog is "bootstrapped" and products are created and merchant offerings are mapped to the new products, either manually or through UPC matches (which don't require manufacturer name merchants).

After defining a data set for a particular pass, clusterer module 804 begins the clustering step. There are a number of well known standard AI "clustering" algorithms, any one of which could suffice for the baseline clustering. However, successful clustering of products often requires augmenting the baseline clustering with numerous elements and adjustments as explained below. A simple outline of a baseline clustering procedure would be as follows:

a. If there are not yet any clusters, i.e. product groups, then the first product becomes the first cluster b. Otherwise, search through the clusters for a close fit c. If there is a close fit, combine it d. If there is no close fit, it becomes its own cluster There are several approaches for determining "close fit". The following sections explain examples of such approaches. The first approach in determining what products are the same, i.e. should be in the same group, is examining manufacturer part numbers, if available, or UPC or model IDs, and normalizing superficial variations in their nomenclature. In so doing, clusterer module 802 makes several passes, and may merge together what were initially separate clusters, as it narrows down the possibilities. This narrowing down is in many cases a virtue of cluster module 802 "teaching itself" what the letter-number patterns appear to be, inductively, in various product families around the industry, and using this knowledge to rule out bad data. Indeed, clusterer module 802 operates differently in many respects because of the fact that bad data is common, as opposed to how it could work in an ideal world where all data sources were pristine.

An example is that one manufacturer may give a part number to all of its video camcorders that starts with the letters "VCM" followed by one more letters, and then three numbers. However, some merchants errantly insert their internal SKU into the manufacturer part number filed (in fact a very common problem). Because the internal SKU of the merchant does not fit the number-letter pattern above, and in fact is very far from it, the system programmed to look for part numbers in the anticipated format would assume that the string having the internal SKU is an error, and proceed to examine other parts of the record where some other data might be found to enable the clustering of the offer in question (for example, despite the bad manufacturer part number, the product name might be in perfect shape, and a perfect match with many other offerings in the database).

Clusterer module 802 should also be able to adapt the numerous ways merchants have of modifying the UPC of a product (few of them leave it as is). Some remove a leading zero, or add a digit or two on the end that has their own internal meaning, or remove the checksum digits. Through automated trial-and-error, clusterer module 802 attempts to de-construct and re-construct a particular merchant's pattern of tweaking the UPCs. This is made possible by having at least one source where the definite and complete UPC is known, and then applying numerous known heuristic techniques, to see which transformation rules will successfully reproduce the definitive UPC, from the merchant's idiosyncratic UPC (this can be done using Hidden Markov Models, for example, or using just standard logic programming). A hidden Markov model (HMM) is a well known variant of a finite state machine having a set of states, Q, an output alphabet, O, transition probabilities, A, output probabilities, B, and initial state probabilities, Pi. The current state is not observable. Instead, each state produces an output with a certain probability, B. Usually the states, Q, and outputs, O, are understood, so an HMM is said to be a triple, (A, B, Pi). HMMs are known for use in speech recognition and other applications.

There are many other functions of clusterer module 802 that are discussed below. After clustering is complete in step 900 of FIG. 8, auto-validation can be performed wherein additional merchant offers that appear over a period of weeks and months, can be matched using the same methods generally as the original clustering in step 900.

When present, a model ID or product name is often the best clue to whether items in separate product description records are the same, and thus should be clustered together in the same group by clusterer module 802. However there are many ways in which this can fail, which need to be accounted for. The first is merely punctuation and capitalization, such as the difference between:

"$69.49 Sony MD-74 Mini-Disc player"
"$75.99 SONY MD74 "
"$68.00 Sony MD 74 Mini Disc Personal Player"

Another is that the Model ID may be concatenated together with extraneous terms such as:

"$59.99 Sony Black MD 74"
"$68.99 Sony Silver MD-74 BB"

Where 'BB' stands for "Bass Boost" and is simply a feature that all such models possess and does not truly indicate its being a different product. By contrast, the difference between black and silver does indicate a significant difference as many persons who are shopping for a silver model would not want to have a black one, and in some cases merchants may even charge more for one color than for another of what is otherwise the identical device.

While only elementary logic is required in order to handle and resolve difference in punctuation, special handling must obtain for items such as color, size, and extra features of the product, or even kits such as:

"$99.50 Special! Sony MD-74 Premium Kit with Mini Speakers and Leather Case"

In this case, the difference in price; the presence of "kit"; the mention of items which the product database shows to be separate categories of products in and of themselves (speakers, case), are all clues that there is a high probability of this offer being a "bundle" of products that includes the MD-74, and is not merely the MD-74 by itself.

In many cases a fuzzy string match can provide some clue as to whether offers might be the same, and is critical in taking care of spelling errors in the source data, e.g.:

"$74.50 Sony Mini-Disc Player MD-74"
"$69.49 Sony Mini-Discc [sic] Player MD74"

As a first pass, fuzzy match on the entire string can easily round up a first batch of candidates for clustering. For example the following list might be chosen from countless thousands of offerings as an initial cluster, on fuzzy match alone:

"Sony MD-80 Mini-Disc Player"
"Mini-Disc Player MD-74 from Sony"
"Sony New MD-74 music disc player"
"M-740 Symphony Synth from Moog"
"Sony MD-74 Personal Music Device"
"Sony 8-inch Mini-TV-80"

Note that all these have a significant overlapping portion of text content. Note however that "Symphony" and "Sony" have a 67% fuzzy match—8 of the 12 characters in both words combined, are the same and in the same order. This shows how inevitable it is that some fuzzy match candidates are still going to be wrong. Nonetheless, that cluster module 802 has only 6 products to process, not 600,000, is an immensely great narrowing down. What remains is to identify the difference between MD-74 and MD-80 as being significant in order to separate the first item in the list above from the rest of items in the list; and then to determine that the presence of "Synth" (or "Moog") and "TV" invalidate the $4^{th}$ and $6^{th}$ items respectively.

Clusterer module 802 should also ignore certain words. Note in the foregoing example the words "New" and "Player" do not really add anything. "New" is an example of an exceptional word that is so often used in the marketing of all kinds of products, that it must be handled separately from the way a random word is handled. Specifically it needs to be ignored for all purposes except separating new from used or refurb products. "Player" on the other hand is helpful in an early pass to develop an initial cluster; however the system must not assign such a great importance to it that the presence vs. non-presence of this single shall count as a different product. This can be well grounded in the fact that "player" is a "generic noun" to refer to an entire category of products. Other examples are "TV", "CD", "Video", and the like. In particularly late stages of clustering step 900, generic nouns can be ignored, because it is simply optional whether marketers include them or not, in product names. This does not take away from the fact that they are important clues in making a first pass at what should be included in the initial cluster.

Numbers such as the "74" and "80" in "MD-74" and "MD-80" can obviously be critical to separating two models of products from one another. As a general rule, there being a different number in a model name or product name should be taken to indicate that it is a different product. However, there need to be exceptions to this as well, for example:

"$12.99 Hasbro Wayne Gretzky #13 Action Figure"
"$13.99 Hasbro Wayne Gretzky 6-inch action Figure Mighty Ducks"

Here the difference between "13" and "6" could make clusterer module 802 assume these are different products, when in fact they are the same. The best way to resolve this is for the system to know which attribute for a particular category might be expressed in numbers and also might be concatenated as part of the product name. In this case, sports action figures have jersey numbers as a possible attribute ("#13") and they also have a height in inches ("6-inch"). By having the system check for these parameters, it can be prevented from assigning a drastically lower probability of match, merely due to the appearance of different numbers within the product name string. In the absence of finding such parameters, the system would lower the probability estimation of the products being a match, whenever there are differing numbers present within the product name.

This is notwithstanding that additional numbers in the names can still rule out the clustering, such as the difference between the "3" and "4" in the following:

"$13.99 Hasbro Wayne Gretzky #13 Action Figure Series 3"
"$14.99 Hasbro Wayne Gretzky 6-inch action Figure Mighty Ducks Series 4"

In determining which names are more likely to be significant for separating clusters, i.e., forming groups of items corresponding to a specific product, a differential frequency analysis can be performed between merchants that are specialized on certain categories, and merchants that broadly cover many categories; similarly, between offerings already catalogued in a certain category, and the entire catalog. The result of this analysis is a list of terms, for each category, that are very much more frequent in that category than generally in the entire corpus. This is useful in categorization of new items (discussed later) but also for clustering, as words (or phrases) that are very common within one category, are usually ones that the system can look upon as not indicating a difference between products in that category. Take for example the word "saber." This will be an infrequently mentioned word in the entire corpus, but very frequently mentioned in action figures, given the predominance of Star Wars action figures that "come with a light saber." Now suppose the system sees two offerings as follows:

"$5.99 Obi Wan Kenobi 6" Nabo garb with light saber"
"$5.99 Obi Wan Kenobi 6" Naboo garb"

Ordinarily, the presence of "saber" in one but not the other, would weigh rather heavily toward counting the items as different, however, the system's recognizing how common it is for "saber" to be mentioned in this category, raises the likelihood that the word is merely an optional descriptive phrase, and not special to one action figure versus another. Again, this is probabilistic and merely one of many factors that can be assessed.

Another pragmatic check which can help the system in clustering step 900, is checking prior probability e.g., examining how many strongly similar products are in the marketplace, as evidenced by the content of the available product information records or other information. If the number is high, then the system should be suspicious even of minor differences in product names. However if the number is low, the system can be more tolerant of minor variations. For example, if there are only one or two "Abraham Lincoln action figure" products in the database, then the probability of an offering constituting an additional product are relatively slim. By contrast, seeing that there are over 100 different "Luke Skywalker action figure" products in the database, suggests that a new Luke Skywalker offering with minor differences in the name, might very well be a new and different model. In other words, the odds of a Luke Skywalker action figure being wrongly clustered, initially, are very great—there is only a 1-in-100 chance that it belongs to any given group. Meanwhile if there are only 2 Abe Lincoln action figures, then there is immediately a 50-50 chance of an offering belonging to on or the other cluster. This can factor into the confidence of any clustering calculation.

In determining the number of groups, the merchant coverage may be considered, such that (1) the largest selection of similar items offered by a single merchant serves as a minimum number of groups for that family of items and (2) the diversity of product coverage of various merchants can be extrapolated to provide a further clue as to the correct number of groups. For example if the system is addressing many hundreds of offerings that look something like "Luke Skywalker Action Figure" then, supposing one merchant along offers 37 different "Luke Skywalkers," the system can presume (on faith that this one particular merchant does not duplicate too many offers in its data set) that at least 37 clusters are needed for this family of products. Further more if there are, among products already UPIDized, approximately 1.5 unique offerings per every 10 offerings altogether (meaning, for example that KB Kids might have 23 such action figures where 3 of the 23 are unique in being offered by KB Kids only, and that this sort of ratio is the average such ratio found among all merchants whose Luke Skywalker action figures have already been UPIDized), then the system can use this information in order to extrapolate (over the remaining set of merchants which have not yet had their offerings of such products UPIDized) as to how many estimated new unique products might be present, assuming the same historical diversity ratio obtains. All these measures are effectively "pragmatic" or "heuristic" measures which can be implemented as weights upon the confidence level of various tentative clustering combinations—a combination which accords well with the aforementioned measures (i.e. falls close to extrapolated figures) will have a higher confidence level than one which departs widely from such measures.

In many cases where names, descriptions, and specs make it hard to for clusterer module 802 to determine whether two products are the same, the prices themselves are an important, and possibly decisive, factor. For example if one offering is $7.99 and the other is $59.99., then, despite superficially similar descriptions, they are very unlikely to be the same product. However there are several caveats. First, the clusterer must be careful to parse and analyze for any exceptional circumstances, such as close-outs or clearance sales, refurbished items, and recertified items (such as returned products in an opened box). In some cases, these items can be much lower in cost.

Another difference that must be factored in is the typical differential in merchant pricing. Many first-tier merchants charge, routinely, up to 30% or even more than some discount merchants. Another consideration is the price competitiveness and consistency in the category. In some categories, the system can determined from items already catalogued, that the price fluctuation among merchants is typically greater than that of other categories. If, after taking all these factors into consideration, the price difference is still very great, then the likelihood of the offerings being of the same product, is lowered accordingly.

Aside from merchant pricing, most merchants also list the MSRP of a product—usually to boast the apparent "savings" derived as the difference of the merchant price and the MSRP. Since merchants usually adopt the same MSRP from a manufacturer or distributor, merchants will tend to be the same as each other in what they construe to be the MSRP, even more so than in the actual merchant prices themselves. So when this information is available, it can also be weighed in by clusterer module 802, in fact, even more heavily than is the similar of merchant pricing. Like many other factors, it should not be merely a Boolean test, but a weight, because sometimes the data will be faulty (e.g. through a merchant's typo or merely through one merchant having an out-of-date MSRP while another merchant reflects the more up-to-date MSRP).

The dilemma in finding these parameters is that clustering ideally takes place prior to categorization. This requires a tentative guess as to the categorization of the product, despite that categorization is not final until the clustering is final. Thus a dialectical or iterative process flow between the algorithms of clusterer module 802 and categorizer module 804 is sometimes desirable or even inevitable. Clusterer module 802 might revise the cluster membership in light of a tentative categorization, but following this, the categorization must be checked again, in which case categorizer module 804 might revise its category "guess" as a result of the cluster having changed. This iterative processing must continue until both the result of clustering step 900 and categorization step 902 have stabilized and both have surpassed their required confidence thresholds. The combination of both their outputs with the highest minimum confidence score between both clusterer module 802 and categorizer module 804 will prevail. In other words if clusterer module 802 has cluster C1 or C2 and categorizer module 804 is outputting category A or B, the following matrix of outcomes could result:

|     | C1 -        | C2 -      |
| --- | ----------- | --------- |
| A - | 0.74/0.32*  | 0.68/0.82 |
| B - | 0.73/0.71   | 0.68/0.74 |

*Clustering confidence/Categorization confidence

Assuming a confidence threshold for both clusterer module 802 and categorizer module 804 of 0.70, the system would go with cluster C1 and category B, as the minimum confidence in that scenario is 0.71—better than in any other scenario, and above thresholds for both. Of course, other algorithms can be used to correlate the results of clusterer module 802 and categorizer module 804.

Generally the system assumes that, the more words that are different in two product names, the less likely they are to be the same product. However the system needs to be able to construe synonyms, hyponyms, and hypernyms in an intelligent manner. For example, consider:

"Sony MD-74 mini-disc player"

"Sony Inc., MD-74 music listening device"

On the surface, there seem to be more words that are different, than are the same. However, "player" is a hyponym of "device" (conversely, "device" is a hypernym of "player"). Meanwhile "Sony" and "Sony Inc" would be treated as synonyms. These words can be assigned partial-credit for a match. These facts, in combination with the matching model number, are likely to be sufficient for cluster module 802 to confidently cluster these offerings.

Further, a product often comes in two or more variants. For example a toaster oven may come in black and white, and its model ID might be any one of the following:

"PG-400-B" [where B signifies Black]

"PG-400-W" [where W signifies "white]

"PG-400" [where text description following mentions black or white or both]

Other examples are right/left-handed golf clubs, etc. These can show up as something similar to:

"Titleist Pro 700 Driver R"

"Titleist Pro 700 Driver L"

Generally these variants, though somewhat superficial from some points of view, are nonetheless separate and individual part numbers from the manufacturer, and are of no small significance to certain shoppers. Therefore they are given unique product IDs. They can however be related as part of a single product line or as configuration variants of a basic model (e.g. when the right-handed golf club is considered the basic model the left-handed is a variant, or when the black toaster oven is considered the basic model, the almond colored one is considered a variant, etc.).

Whether products should be, in any sense, clustered, is partly a matter of the purpose-at-hand. While generally clustering refers to the assigning a single-model, i.e. product, to its various price offerings by grouping together product information records corresponding to the product. However, there are meaningful configuration variants that, while technically counting as different models, are often thought by consumers and even retailers as being "essentially" the same model, but just in varying styles, etc. Likewise, product models can be part of a series, and multiple product series can be part of a product family, etc. Clusterer module 802 therefore can provide plural levels of super-clustering and/or sub-clustering. One among many possible semantic labeling schemata for these levels is as follows:

(1) Product Line (2) Product Family (3) Product Series (4) Model*

(5) Configuration of model

The asterisk (*) indicates the baseline clustering performed by clusterer module 802 at the level of merchant offers, can occur procedurally before any super-clustering (levels 1–3) and sub-clustering (level 5). An example of all five levels would be the Fujistu Lifebook P-2040 with 384 MB RAM. The Fujitsu brand has the "Lifebook" product line, in which is the "P" family of notebook computers (as opposed to the"S" family), within which is the "2000" series (as opposed to the 1000 series), within which is the "2040" model (as opposed to the 2080 and 2100 models), and which can optionally come, brand new, with 384 MB RAM (as opposed to having 256 or 512 MB RAM).

The same fundamental methods of clustering are used at any levels, merely with a different set of differences in naming and specifications that either are or are not considered to be significant for the level in question.

Categorization step 902 includes the process of assigning each UPID to a proper category within taxonomy 700. This can be accomplished chiefly by two processes. First, the attributes and attribute value sets defined for each category, in a known manner along with their aliases, synonyms, hypernyms, etc. can be examined. Second, actual product information records already classified in each category can be examined. Any number of AI machine-learning algorithms can be used for the classification including but not limited to: case-based reasoning, genetic algorithms, neural nets, etc. What is importation is the feature extraction that precedes the invocation of the machine-learning module, and not so much which particular kind of machine-learning module is used.

In the feature extraction process of categorization step 902, each matching item that is found in the product information records, whether an attribute name, value, unit of measure; a brand name; keywords and phrases found in product descriptions, etc. counts in favor of the product being in that category. Conversely, items found that seem to conflict, bring about major deductions in probability scores. Ultimately a final score is reached for each UPID against each category. The hope is that a confidence threshold will be surpassed on one and only one leaf-node category. In the minority of cases where this result does not obtain, a manual (or other external) validation is can be used, or the categorization can be deferred.

Usually for marketing reasons, resellers produce very long, very "ugly" names for their products. This is especially true in the online world where resellers are trying to please the search engines' web crawlers as much as they are human beings—meaning they want to include every conceivable relevant piece of text in the product name. Otherwise, they are afraid, they might not get the search results ranking on Google or Yahoo! Search that they are hoping for. The result is that a ideal product name such as:

"Sony MD-74 Mini-Disc Player"

is often listed in a product record as:

"New Sony MD-74 (MD74, MD74) Mini-Disc Player Personal Music Listening Device with Rebate and Free Leather Case Now For Grads and Dads"

Fortunately, not all names are this long and extraneous in nature. However, name cleansing step 904 is still required in many cases. The first obvious step in determining an attractive name screen to be used for the UPID product record, is to eliminate those that are very long, in favor of those that are not.

The other kind of undesirable name is that which tries to over-load the name field as a mini-product-spec table, all in on, such as:

"Sony MD-74 23-hr battery, 6 watt output, headphones, 8 oz"

"Consider this along with:

"Sony Corp. MD-74 Mini-Disc Personal Music Listening Device"

Here the length of the name alone does not help since both are nearly the same length, yet the latter is greatly preferred over the former for cataloging purposes. By noting that the former contains many attribute names and attribute value strings from the product record, we can assign "de-merits" to that name, i.e. make it less likely to be selected as the product name by name selector/cleanser module 806.

Also, marketers have a habit of overloading the name field of product information records to carry many other elements of information besides the name of product. There is virtually no limit to this in terms of vocabulary. However certain linguistic cues can be semantically related to marketing, either through a manual list or through statistical accounting of which words are more commonly included in the marketing "fluff" that clutters product names. The statistical approach is attractive in that is more automated. This procedure requires some sample data to have been tagged as having "marketing language" in the names, together with a contrasting set of data that shows the same product names without the marketing language. A differential analysis, with word/phrase frequency, word contiguity, and other standard statistical NLP methods can be applied to determine a good probabilistic profile of what constitutes marketing language for each category of product.

Once name selector/cleanser 806 has narrowed down possible names to a simple, concise, clean product name, it is also desirable to generate an optional longer name that is canonical. Canonical means that it follows a consistent form across categories, which is to mention only (a) the most important variant configuration elements (such as color, right-handed) and (b) the most important attributes (such as the resolution of a digital camera). Having a reliable, consistent style of long name lets those who utilize the catalog enjoy maximum flexibility in surfacing a short name, or a long name, as best fits their applications.

In step 906, image selector module 808 chooses the most preferable image from all various sources, based on size, type, quality, proportion, reliability of source, etc. Various rules and thresholds can be used to select the most preferable image. For example, the image may have to be of a certain minimum resolution and size. Alternatively, image selector module 808 can be programmed to use the image from product information records from a list of preferred sources (e.g. merchant servers 40) in order of availability.

In step 908, property scraper module 810 parses and analyzes the product information records, such as web pages or PDF documents form a source such as a merchant, manufacturer, distributor, reviewer, or the like, to extract the product spec information from that source in a normalized form. Property scraper module 810 can then discard or leave the text of the product information record in question.

Property scraping step 908 can be accomplished as follows. First DOM (Document object modeling) can be accomplished to separate the main product spec portion of the page from any cross-sell or up-sell merchandise, and from any linked accessories, etc. Next, different sentence, phrase and table structures can be parsed to spot individual specs on the page one at a time. Negation and other functions can be handled separately so that property scraper module 810 does not mistakenly construe these as being built-in to the product. Resolving of synonyms and aliases to normalize the jargon used among various product information records for both the attribute names and the values can also be accomplished. Bonus keywords or specs that do not fit pre-defined specs for the category of product in question, including a gathering of any novel specs that would otherwise "fall between the cracks" can be retrieved. A confidence level can be assigned to each act of scraping, based on things like whether the attribute name and value were both found, or just the value string was found; or based on whether there some extraneous words found in between the attribute name and value, or whether there were line breaks or adjacent cells in a table (all of these items introduce some risk that the spec is somehow modified, qualified, or disclaimerized and therefore might possibly not be exactly the spec which it appears to be). Also, the scraper may pick up conflicting information on the page (e.g. they sell one size, but later explain it is available in many), so this lowers the confidence, and higher confidence is given to the text that seems more likely to be correct (i.e. the one that is more closely collocated with the other specs on the page). The weighted combination of all these methods results is a confidence score for each individual spec value from each product information record that is scraped.

It is often important for the system to perform recognition and conversion of units of measure to a standard for each spec, handling both synonyms, e.g. "lbs." to "lb.", and conversion, e.g. "2.2 lb." to "1 kg". In the event that the attribute name cannot be found, the units can sometimes reliably identify a correct value (e.g. 3.1 megapixel camera does not need the word "resolution" in order to deduce that "3.1 megapixel" is the resolution, due to the uniqueness of the "megapixel" unit withing that category). Numbers must be parsed in all variously expressed styles, including fractions, Roman numerals, and those formatted with commas. Numeric ranges need to be recognized both as a possibility in the attribute setup, i.e. having a composite attribute composed of "min" and "max" atomic attributes. Different types of verbiage may indicate a range, such as a comma separated list of values (e.g. for 1, 2, or 3 players), a hyphenated min-max range, etc.

Textual-type attributes may have different rules. In specs, a Boolean-type attribute (no/yes) will require the attribute name to be present, and not require the word "yes." Correctly determining the "no" value is a bit more tricky, as it requires the system to look for other negating language, usually other than a simple "no" (e.g. "optional" or "not included").

In other cases, particularly with attributes that allow multiple values, or where the language of the values themselves is distinct enough not to require qualification by inclusion of the attribute within the product name field or within a definite description in the product text, e.g. "This HDTV television . . . " clearly indicates to the reader that "HDTV" refers to the "Compatibility" attribute.

The source document from a particular product information record is often HTML, XML, PDF or another tag-laden document type. This is both a benefit and a detriment to property scraper module 810, in that these tags can both indicate and obscure the specs that are being sought. Therefore, multiple passes (utilizing different methods of handling the tags) can be used, as explained below.

One method is to simply ignore the tags by parsing them out. This method, simple though it may be, actually yields a great deal of specs. For example, if an action figure product page on a website reads "Height: 6-inch" it may read, in the HTML sources as "Height: <TC><Font: Helvetica></B><I>6 inches". In other words, there are intervening tags whose purpose is to align the information within a table, change the font from one column to the next, etc. By merely tossing out the tags within one row of the table (while keeping the information that it is within a single row), the scraper sees "Height: 6", and suddenly the spec is very near to being scrapable.

However in many other cases, the tagging must be parsed and analyzed, rather than merely discarded, in order to yield the desired result. Take the same example as above, where on the row above we might have "Phantom Series 4"

and on the row below have

"vehicle included".

By maintaining or parsing the row-delineation tags, property scraper module 810 knows that "Phantom Series 4" is one row, and "Height: 6" is one row, and " vehicle included" is another. If all the tags were ignored, then property scraper module 810 would lose this row delimiting, and would have the continuous string:

"Phantom Series 4" Height: 6 vehicle included"

This would be harder to parse and analyze, and there is probably some risk that the system might think the action figure is 4 inches in height and comes with a 6-inch vehicle! Thus it is critical to actually parse the tags and thereby maintain the document structure.

There are a myriad of other ways in which the tagging is informative. Another case is where the system is trying to determine where the list of specs ends, in a block of text. Often the Product Information Record will, for example, switch fonts or text style or paragraph indentation when the specs are coming to an end and when a list of cross-sell products is about to begin. It is vital that this transition be noted so that the cross-sell products are not accidentally construed as features of the main product itself (e.g. construing a memory card that is an optional accessory for a digital camera, as something that comes with the camera).

Many product information records produce tables that do not, unfortunately, put the attribute name and value close to each other at all. An example is the following:

| Pick the P-2000 Series Configuration That is Right For You! | | | | |
|---|---|---|---|---|
| Fujitsu P-Series Model | RAM | Wi-Fi Included | OS | Price |
| P-2040 | 256 | No | XP Home | $1249 |
| P-2080 | 384 | No | XP Home | $1399 |
| P-2100 | 512 | Yes | XP Pro | $1549 |

In this example, multiple variant models are listed together in a single table, and the header row must be parsed and one column at a time must be scraped, in order to gather the specs correctly for each model.

Some tables found in product information records are even more complicated in that they express multi-dimensional combinatorial specs. A very common example is the combination of pants waist and inseam sizes, that are usually available in some but not all possible combinations. Here is an example:

| Waist size* | Inseams Available** | Colors avail. |
|---|---|---|
| 22"–28" | 26"–34" | Black, Navy, Tan, Forest |
| 29"–39" | 28"–42" | Black, Navy, Tan, Forest |
| 40"–44" | 30"–44" | Black, Navy |

*Odd and even sizes available
**Even sizes available

Note that not only must the table be parsed, but the annotations must be understood, in order for the scraper to actually assemble the following "canonical" table:

| Waist size (inches) | Inseams Available (inches) | Colors Available |
|---|---|---|
| 22–28 | 26, 28, 30, 32, 34 | Black, Navy, Tan, Forest |
| 29–39 | 28, 30, 32, 34, 36, 38, 40, 42 | Black, Navy, Tan, Forest |
| 40–44 | 30, 32, 34, 36, 38, 40, 42, 44 | Black, Navy |

The system must be configurable to force some attribute values to default to "no" or "none" when there are multiple sources which are silent about the attribute, and not a single source has mentioned it. This is needed because of the tendency marketers have of not mentioning when their product lacks a feature, and mentioning it only when their product does have the feature. For example, only a few of the higher-end digital cameras might have an interchangeable lens. It is virtually guaranteed that if a product page makes no mention of this feature at all, then the camera does not have one. However, no marketer will miss the opportunity to boast of their camera having this type of lens, if it does. Therefore the system can detect this pattern and begin to default to "no" on the attribute "interchangeable lens" when it has found multiple reliable sources that fail to mention the feature for a particular camera.

Supplemental keyword generator 812 analyzes every product information record with reference to open-ended keywords for each category, rather than for normalized specs. These follow from the DOM analysis, in that the system recognizes strings or tokens which it appears the product information record is putting forward as a spec, and yet do not fit neatly into any pre-defined specs within the system. This catches so special one-off specs that otherwise would fall between the cracks. For example, among 50 different baby-car seats there may be just one or two which say "one-hand harness release" where this feature is not a recognized and normalized spec within the category attribute listing. Nonetheless, that it is presented by a couple of product information records right along with the other specs for the same car seat, enables the system to, as it were, add the phrase as an "appendix" of sorts, to the normalized specs. This is a very powerful feature for (1) categories where there are many esoteric and unique features that are not worth normalizing or (2) helping the system administrators stay on top of new emerging specs that appear as manufacturers add new features to their products (the administrators will be alerted and review cases where a large number of overlapping supplemental keyword specs have been added for a particular category, to see if the case constitutes a new spec that should be added in a normalized manner).

Property aggregator module 814 of the preferred embodiment is a voting engine which assigns some product information records a greater weight than others, and then attempts to merge the scraped specs from all Product Information Records for a particular product, to arrive at a final set of specs. This resolves contradictions which are very commonly found among multiple sources. The property aggregator assigns great significance to finding multiple attestations for a spec—defined as having multiple sources of data that have a different format (therefore apparently not being mere clones of one another) yet agree on the essential content of the specs in question.

The weights can be automatically set or manually set. The automatic setting is a result, over time, of how often the product information record has been countermanded in the final result. It is possible for a weighting to set either globally over the entire product information record, or just for one category, or just for one attribute in one category, or just for one value of one attribute in that category, or just for one manufacturer of products in that category. Also there is a separate weighting for image reliability, globally, per category, per manufacturer, and per manufacturer-in-category.

Chief components of the allied products module of the preferred embodiment are:

1) a product relations tool for manually defining accessory relations between products and categories, with constraints; and for viewing or manually overriding specific products' assignments as allied products that have been made automatically; and 2) an allied products engine including logic and algorithms for combing the raw source data whence affiliated product relations will be automatically "discovered."

All of the following relations are definable:

Category-to-Category relation: Stipulates that products within category A are allied to products within category B. A property constraint is optional. For example, Compact Flash Cards may be allied to the category of PDA's, with the constraint that the memory module type for a PDA must be "Compact Flash" in order for the relation to obtain.

Category-to-Product relation: Stipulates that a category of products are allied to a particular product. An example would be "XBOX Cartridges" which, taken as an entire category, are allied to the particular product "XBOX Game Console."

Product-to-Category relation: Stipulates that a particular product is allied to an entire category of products, with an optional constraint, e.g. that a particular leather case is allied to the entire category of "digital cameras" with the constraint that their property of "form factor" be indicated as "compact."

Product-to-Product relation—Stipulates that a particular product is related to another particular product, e.g. that a particular model printer cartridge is allied to a particular model photo-printer.

A software tool can be provided that allows all the foregoing relations to be defined manually, with or without constraints, optionally marked as "potential." A software tool can be defined to allow a user to designate the allied product type as one of "accessory" or "part" or "supply" etc. Also there are "highlighted" types within each type—those which human editorial knowledge dictates as being of special interest. In the absence of manually highlighted relations for each product, the discovery engine auto-highlights the highest scoring relations, eliminating closely resembling products (using category and fuzzy name comparisons) in order to give variability in the top 3 highlighted relations (e.g. you might want to simply highlight the size variations of the same Compact Flash card, even though they may have the highest score). A software tool can be provided to allow a potential relation to be negated, i.e. for a user to indicate that a category should not be considered allied to another. This is to help the discovery engine avoid erroneous or wasteful processing. This is achieved by making a potential category-category relation with a manual score of 0.

Allied Products Module 818 includes algorithms to identify which component of various product information sources is the "allied products table" within the web page or other source. For example, which part of the HTML template of a merchant's web page is reliably found to be its accessory listing. This is accomplished by visiting the merchant pages and looking for references to current high scoring and manual relations, then identifying and recording the area in the page where these links are found. Subsequent visits to the merchant sites can use this information to adjust the scoring accordingly, depending on where links to possibly related products are found on the page. The Allied Products Module 818 follows links found in the various allied products tables and checks for products in known categories. When the scanner has found n repeated instances of products in the same category for products in the category it is currently scanning, it will auto-create the appropriate category-category relation, marked as "potential," and notification can be provided to the appropriate category manager, through email or another communications channel.

The Allied Products Module 818 generally operates in accordance with the following algorithm to effect allied products step 916:

1. For each product in a category
    a. Get all merchant offers, for each merchant (this part is multi-threaded):
        i. Load and parse the merchant's web page (also, cache the page)
        ii. Look for links on the page to "related products"
        iii. If there are links on that page that lead to auxiliary accessory pages, then follow the link and go back to 1.a.i.
        iv. Reverse look up product references and relate them back to the catalog, compute a product relation score and record the mapping and the score.
2. Calculate a final product relation score.

Each of these algorithm steps will now be explained in detail. A main challenge of the Allied Products Module 818 is to be able to realize when a merchant is referring to a product on its web page. Due to variability in the expression of product names, the only reliable way to specifically identify a product is through "merchant SKUs", or the unique product identifier that the merchant uses to refer to a product. In order to be able to recognize that a link on the merchant's page actually refers to a product already in the catalog, it is necessary to perform the step of "merchant SKU discovery". The first time that the Allied Products Module 818 searches the URL of a merchant, it looks to see if it has done this before. If it has not, the program loads all of the URLs from the merchant that are present in catalog 26. The URLs are compared to each other and the variable part is determined to be a SKU. These SKUs are recorded for each merchant, with mappings back to product Ids in catalog 26, along with the delimiting characters that help to isolate the merchant SKU from the URL. When a URL is encountered on the merchant's page, the URL is dissected using the delimiters, and each sub-string the URL is searched for in the list of SKUs previously recorded from the merchant. If a match is found, then the Allied Products Module 818 knows that the URL refers to a product in the catalog.

Often, when the Allied Products Module 818 processes a merchant page, or other product information source, to look for related product links, the merchant has decided to put the list of products on another page, e.g. http://www.buydig.com/shop.php?prod_id=CNPSA70&adv=cnet. In such a case, the Allied Products Module 818 must analyze the language in links like this, and follow them in order to find the product relations. The Allied Products Module 818 can use a mini-lexicon and can include the confidence that this link actually refers to accessories for the given product to the eventual scores for each resulting product reference. Sometimes links to accessory listings may actually be small images. OCR can be used in a known manner to get the text out of the image.

Many factors go into calculating a product relation score for relations that are discovered for each merchant. These can include:

Providing a higher score based on whether the related product was manufactured by the same company.

If the link includes language such as " ... for ... ", then the remaining part of the text is examined to see how well it matches, and the score is increased or reduced accordingly. This must take into consideration references such as "for Palm 500 series", in which case it must be determined that a Palm 515 should get a bonus, as the word "series" indicates that the 515 is part of that. In contrast, if the link said "for Palm 505 only", then the presence of the word "only" would indicate that a Palm 515 relating to this product should get a lower score. This kind of analysis requires identification of model IDs, and recognition of different types of including/exclusion language, as well as series specification and matching of model IDs.

If the link includes a generic reference to entire categories or products, then a bonus is given if the category verbiage matches, e.g. "Viking MMC32M32MB MultiMedia Card for a MP3 player, PDA or digital camera", when the PDA category is scanned, for example. This requires good lexicon synonym coverage for category names.

Parsing HTML document from the merchant and when a link is found, the "group text concept" occurring prior to the link is searched for. For example, the heading before a set of related product links may be "Add-ons", or "Accessories for the XXX", etc. This is difficult, as there are a number of ways a merchant may do this in HTML. Placement, text characteristics, and language are all considered when looking for what these product links might refer to. When the group text concept is found, the score is increased if the language indicates that the list of links constitutes related products. The score is reduced for other types of relations, such as "Other people who bought this product also bought these . . . ". Sometimes these "headers" are actually small images, so using OCR to get the text out of the image must be used in these cases.

Discarding references to the products within the same category.

Considering the price of the related product, as generally an accessory of a major product will cost less than a major product, such as a digital camera or notebook computer.

Once all of the relations have been gathered for a product from all of the merchants, then the overall relation scores are calculated. The following can be factors in the computation:

All of the merchant references are gathered, and higher scores are given to related products that were referred to by more than one merchant. This is not entirely reliable, as not all merchants may carry the product being scanned, for example there may be only 1 merchant in our list of merchants for a given product.

The merchant rating (set manually by the catalog editor) for how well it specifies related products increases or decreases its contribution to the overall score for a given relation.

The Potential Category-Category relations are taken into consideration and also contribute to modifying the score, both positively and negatively depending on the score of the potential relation that was previously discovered.

When a whole category of products has been scanned, the following can be considered, in order to determine if the whole category itself can be allied to some products or to some other categories:

Category counts—the total number of related products in each category are counted up. Categories with more related products in them are more likely to be validly related on the whole as an allied category of products, so the scores are adjusted accordingly based on the category counts. For example in the category of "Handheld Device Cases", nearly every product within this category will already have a relation (or many relations) to other products. This fact indicates strongly that the entire category itself, i.e. "Handheld Device Cases" has a better chance of being itself validly related to some products as an allied category of products.

Give score penalties for the related category being a "miscellaneous" type of category—although such a category may contain some products that would have valid relations, generally the miscellaneous category, on the whole, is not relevant to any particular product.

Give a score penalty for relations from sibling categories, since, so long as the category tree is well conceived, such relations are usually bad (e.g. a desktop related to a notebook).

The catalog editor may mark certain categories as being better or worse for the likelihood of having related products, and the system will use that information to adjust the scores (these are the Potential Category-Category relations?).

If the scores pass a scanning threshold, then they are saved to the database, where the scores may be manually overridden if need be. There are actually two thresholds, a "scanning threshold" and a "publish threshold". If the "scanning threshold" is met, the relation is saved, even though it may not get published. The idea here is that a good relation may get a low score for some reason but that the user may manually override the score if the relation is deemed worthy of publishing.

A final pass for each product is to "highlight" the top 3 (or top n) products. The highlighted related products are composed of the highest scoring products, as well as the products that are not too similar looking (in order to give a good variety to the user when the related products page is first viewed). The Allied Products Module 818 takes the relation with the highest score, then moves onto the next one, checking the category that it is in and similarities in the product names. If the products go over a similarity threshold, then the second product is not highlighted, and the system moves onto the third highest scoring relation, and so on. A catalog editor may manually highlight products, and these take precedence.

Sometimes many relations are found that are very similar, making the browsing of these products tedious. The Allied Products Module 818 provides clustering information that allows the application, such as a web browser to optionally show the highest scoring relation in a cluster and not show others, but instead show a "more like this . . . " link. The clusters are created using the opposite logic of the highlighting phase, and score relations on their similarity, including the category, manufacturer, fuzzy product name match (particularly differences that focus on variant-type language, including differing by one attribute, etc.), manually created cluster patterns, price, etc.

Once the allied products list is created and saved, product information records can be retrieved from merchants for products in accessory categories marked in the taxonomy. Product links or language that would signify what products/ models this is allied to can be located by doing a look up in a product database and assigning confidence levels to the results using known sophisticated parsing techniques. The results from all merchants can be aggregated, a voting mechanism can be applied, and another list can be created. Both of these lists of relations can be used to derive an aggregated score. If the score is greater than a predetermined threshold, then the Product-to-Product link can be created in the table. This can include an inference to other product relations because of the main product being in a product line, e.g. one case may fit all Palm M series.

On second-pass scanning, only "potential" relations will be considered; the engine will ignore links not found to abide by these potential relations; but will archive the items thus ignored. When a certain mass of such items has been accumulated (or when a specified time period has elapsed) the first-pass scanning will be repeated.

During the aforementioned procedures of clusterer module 802, categorizer module 804, property scraper module 810, property aggregator module 814, description generator module 816, and allied products module 818, any number of products or offerings (or relations or bundles) can and will fall below required confidence thresholds. Post processing module 820 handles such products. These can either be deferred and saved until more data is available for the automated system to work from, or they can be retained in an incomplete and merely quasi-"UPIDized" form. Alternatively, they can be moved over to a tool for human editors to patch them up as much as possible, e.g. a product may not have had enough information to classify a TV between CRT TVs and portable TVs with enough confidence, and so an appropriate error status would be set, drawing a human being's attention right to the attribute that is in question, so that it can be filled in.

Previous tests of the entire procedure outlined in this documented have resulted in at least 80% automation (i.e. labor reduction, compared to using the "brute-force" method of manual data entry) and as high as 96% in some categories, while maintaining comparable accuracy and actually superior normalization to manual methods; this is from a test of over twenty diverse product categories ranging from action figures to heart monitors to baby car seats.

Furthermore, it should also be noted that one embodiment of the present invention has been described above where the Internet is the networked computer environment and the crawler is a Web crawler. Moreover, in the embodiment described above, the manufacturer's product specifications Web pages are deemed to be the manufacturer's product specifications source and the merchant's Web page are deemed to be the merchant's information source. However, the present invention is not limited thereto and may be applied to other types of networked computer environments and other sources as well. The present invention can be implemented over any type of communications channel, such as the Internet, a local area network (LAN), a wide area network (WAN), direct computer connections, or the like, using any type of communication hardware and protocols. Any type of hardware or combination of hardware can be used for the various clients and servers. Accordingly, the term "computer" as used above, refers to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used above refers to any collection of information such as a database file, a lookup table, or the like.

Thus, the above described method and apparatus in accordance with the embodiments of the present invention provides a very effective system and method for aggregating desirable product information. As can now be fully appreciated, the present invention facilitates on-line commerce by allowing the provision of important product information to the shopper to thereby facilitate an informed purchase decision by the shopper. The present invention also provides a novel method for efficiently aggregating such product information from a networked computer environment and also provides a novel method for providing updated product information to shoppers thereby facilitating the purchase decision of the shopper.

The invention has been described through a preferred embodiment. However various modifications can be made without departing from the scope of the invention as defined by the appended claims and legal equivalents.

Glossary allied product: a product that integrates functionally with another product—e.g. an accessory (envelope feeder for a printer), part (replacement screen for a PDA), supply (paper or printer cartridge), or maintenance equipment (tape head cleaner). The differences between these are significant as regards the exhaustibility of the item, whether a person typically buys it once, or many times, etc.

associated product: a broad term embracing all allied, variant, family and bundled products.

attribute value set: the set of all possible values recorded (or recordable) within the system for a particular attribute.

attribute: a function, relation, quality, quantity, purpose, material, format, structure, or effect produced, of a product. See also property.

categorization: the process of assigning a product to the category within a taxonomy where it most properly belongs.

category: a group of products sharing the same essential property definition as each other and occupying the same node in a taxonomy as each other.

clustering: the process of collecting into a group the offerings from different merchants that are of the identical product (or identical combination of products).

confidence score: a metric of the confidence that data is correct or reliable, e.g., that a product name or reference has been parsed and identified correctly being put forth by a data source as an allied product of another product, i.e. how sure is the system that what a given web page is saying, is that product A is an accessory for product B?

DOM:(Document Object Modeling): analyzing an HTML web page to segment it into various regions, e.g. header, footer, product spec table, product text description, recommended accessories, cross-sell/up-sell product listing, nav bar, ad blocks, etc. This can be a preliminary step to set up property scraping, item clustering, accessory discovery, etc.

minimum manufacturer name: the resulting string after a manufacturer name string has removed from various extraneous or common suffixes such as "Inc.", "Corp." etc.

normalization: The process of identifying attribute names and/or attribute values which have the same meaning but are expressed in superficially different nomenclature, and mapping them to a single, consistent form of expression.

normalized attribute value sets: attribute value sets that are fully normalized (see normalization), including any applicable units-of-measure. The attribute names themselves may or may not be normalized.

normalized attributes: Normalized attributes are those where the name of each attribute is normalized—the value set for the attribute may or may not be normalized.

normalized specs: A set of data consisting of attribute name/value/unit information where all of these elements are normalized.

potential relation: establishes a relation as valid by definition but subject to specific product compatibility testing. E.g. styluses are "potentially" linked to PDAs in general, but are subject to compatibility.

prior probability: the odds of a random guess being correct out of all the possibilities that conceptually exist. E.g. in clustering, if there are 2 products of a given type in the catalog and a new, unknown offering is about to be analyzed, its clustering has a prior probability of 0.33 (reflecting the 1-in-3 chance of its either being the same as one of the 2 products in the database, or being a third new one). A new offering compared against 99 catalogued products would have a prior probability for clustering of 0.01. The prior probability can affect the confidence estimations at various stages of clustering. Prior probability plays a role, mutatis mutandis, in various other aspects in auto-generation of catalog.

product bundle: a main product combined with any number of accessories, parts or supplies.

property: An attribute that either is intrinsic or else derives solely from perception of or use of the product in respect to its intrinsic properties. Some attributes of a product such as Brand, Price and Distributor SKU are not properties, as they may derive from other external forces apart from use of the product.

quasi-UPIDized: A set of data representing product offers that have been, in most instances, UPID-ized, but where a minority of product offers are not UPID-ized. (see UPID)

sister product: a similar, though distinctly different product that is a member of the same product line, series, or family, e.g. Palm V vs. Palm Vx.

taxonomy: a hierarchical tree, or other grouping of product categories.

UPID: "Universal Product ID" An identifier of one particular product among its multiple, variously described and variously named offers. Where available, a manufacturer part number, model ID, catalog number, or ISBN number can serve as the UPID. In many cases, no such UPID exists in external data sources and must be created and assigned by the system.

variant product: a version of a product that has a difference in feature configuration from the manufacturer or dealer but is essentially the same product. E.g. a notebook with 128 MB Ram and the same notebook but with 256 MB RAM.

What is claimed:

1. A method of creating a product catalog stored on computer readable media by aggregating product information from a plurality of product information sources having disparate formats for product information and storing the information in a taxonomy, said method comprising:

processing plural product information records from the product information sources into one or more groups based on which product information records are likely to correspond to the same product;

correlating a unique product ID corresponding to the product associated with each of said groups to identify the product;

electronically comparing each identified product to categories of a taxonomy to determine a category for the identified products in the taxonomy; and electronically parsing the product information records corresponding to each group to electronically determine attributes for each categorized product based on the product information records;

electronically generating product specifications based on the determined attributes; and storing the product specification in the corresponding determined categories of the taxonomy.

2. A method as recited in claim 1, wherein said processing step includes determining which products referred to in said product information records are likely to be the same by comparing data strings associated with the products, and determining a common data string.

3. A method as recited in claim 2, wherein said data strings include at least one of manufacturer part numbers, model identifiers and uniform product codes.

4. A method as recited in claim 1, wherein said processing step comprises comparing product names in the product information records and grouping together all products having a substantially similar product name.

5. A method as recited in claim 4, wherein said product names are compared without regard for differences in capitalization and punctuation.

6. A method as recited in claim 4, further comprising a second processing step wherein generic nouns associated with the products are parsed and ignored in determining the groups.

7. A method as recited in claim 1, wherein said processing step comprises parsing selected adjectives and ignoring the selected adjectives in determining the groups.

8. A method as recited in claim 1, wherein said processing step comprises considering prices in the product information records associated with the products.

9. A method as recited in claim 1, wherein said processing step comprises considering synonym, hyernym and hyponym relationships in descriptions of the products in the product information records.

10. A method as recited in claim 1, wherein said processing step comprises considering merchant coverage indicated in the product information records.

11. A method as recited in claim 1, wherein said processing step includes the steps of grouping said products into subgroups and/or super groups.

12. The method as recited in claim 1, wherein said processing plural product information records includes ignoring minor variances in product information records determined to be insignificant.

13. A method as recited in claim 1, further comprising determining a product name for each identified product.

14. A method as recited in claim 1, further comprising determining a product image for each identified product by selecting a most preferable product image from said product information records.

15. The method as recited in claim 14, wherein selection of said most preferable product image is based on at least one of size, type, quality, proportion, and source.

16. A method as recited in claim 1, further comprising generating a description of each identified product at least in part from said determined attributes.

17. A method as recited in claim 1, wherein said processing step comprises examining identification codes associated with each product information record by parsing identification codes present in the product information records and comparing said parsed identification codes to determine commonalities between them.

18. A method as recited in claim 17, wherein each product information record is examined more than once to determine a common identification code associated with each product.

19. A method as recited in claim 1, further comprising the step of repeating said processing step after said comparison step, and then performing said comparison step again.

20. A method as recited in claim 1, wherein said processing step comprises generating a crawler from a server to the product information sources.

21. The method of claim 1, further comprising determining allied products for at least one of the products.

22. The method as recited in claim 21, wherein said step of determining allied products comprises:
parsing at least one product information record corresponding to a product;
if there is a link in the product information record to related products, following the link to a related product information record;
reverse looking up references to the product in the related product information record; and
relating the related product in the related product information record to the product in the catalog.

23. The method of claim 1, further comprising aggregating product information from a plurality of product information sources in a networked computer environment for processing using a crawler to visit the plurality of information sources.

24. The method of claim 23, further comprising gathering product phrase information and characteristics of said product phrase information from each of the plurality of sources via said crawler.

25. The method of claim 24, further comprising creating a catalog of products based on the product phrase information and characteristics of said product phrase information.

26. The method of claim 24, wherein said characteristic of said phrase includes at least one of frequency, location, font size, font style, font case, font effects, font color, collocation and co-occurrence of said phrase in each of said plurality of sources.

27. The method of claim 23, wherein the plurality of sources include at least one of a manufacturer's product specifications source, a product literature source, and a merchant's information source.

28. The method of claim 23, wherein said crawler includes a product literature crawler that gathers product phrase information from at least one of said manufacturer's product specifications source and said product literature source.

29. The method of claim 23, further comprising comparing said product phrase information to a categories of a taxonomy to determine product category of products described by the product phrase information.

30. The method of claim 23, further comprising determining allied products for at least one of the products.

31. The method as recited in claim 30, wherein said determining allied products comprises:
parsing at least one product information record corresponding to a product;
if there is a link in the product information record to related products, following the link to a related product information record;
reverse looking up references to the product in the related product information record; and
relating the related product in the related product information record to the product in the catalog.

32. A method of creating a product catalog stored on computer readable media by aggregating product information from a plurality of product information sources having disparate formats for product information and storing the information in a taxonomy, said method comprising:
processing plural product information records from the product information sources into one or more groups based on which product information records are likely to correspond to the same product;
correlating a uniciue product ID corresponding to the product associated with each of said groups to identify the product;
comparing each identified product to categories of a taxonomy to determine a category for the identified products in the taxonomy;
determining attributes for each categorized product based on the product information records corresponding to each group;
creating product specifications based on the determined attributes; and storing the product specification in the corresponding determined categories of the taxonomy;
wherein said determining step comprises:
scraping attribute values from plural product information records in a group and assigning a confidence rating to each scraped attribute value; and
merging the attribute values into a set of product specification attributes based on the confidence ratings.

33. The method as recited in claim 32, wherein said processing plural product information records includes ignoring minor variances in product information records determined to be insignificant.

34. A method of creating a product catalog stored on computer readable media by aggregating product information from a plurality of product information sources having disparate formats for product information and storing the information in a taxonomy, said method comprising:

processing plural product information records from the product information sources into one or more groups based on which product information records are likely to correspond to the same product;

correlating a unique product ID corresponding to the product associated with each of said groups to identify the product;

comparing each identified product to categories of a taxonomy to determine a category for the identified products in the taxonomy; and determining attributes for each categorized product based on the product information records corresponding to each group;

creating product specifications based on the determined attributes; storing the product specification in the corresponding determined categories of the taxonomy; and determining a product name for each identified product; wherein said step of determining a name comprises:

selecting the best name of multiple variant product names from product information records in a group;

cleansing the best name of superfluous and concatenated text; and formatting the cleansed name into a product name that is of a predetermined style.

35. A method of creating a product catalog stored on computer readable media by aggregating product information from a plurality of product information sources having disparate formats for product information and storing the information in a taxonomy, said method comprising:

processing plural product information records from the product information sources into one or more groups based on which product information records are likely to correspond to the same product;

correlating a unique product ID corresponding to the product associated with each of said groups to identify the product;

comparing each identified product to categories of a taxonomy to determine a category for the identified products in the taxonomy;

determining attributes for each categorized product based on the product information records corresponding to each group;

creating product specifications based on the determined attributes; and storing the product specification in the corresponding determined categories of the taxonomy; and further comprising the steps of determining when an outcome of one or more of said processing, correlating, comparing and determining steps falls below a predetermined confidence level and flagging said outcome for further processing.

36. A method as recited in claim 35, wherein said flagged outcome is deferred and saved and re-processed when more product information sources become available.

37. A method as recited in claim 35, wherein said flagged outcome is moved to a processing tool for a manual operation.

38. The method as recited in claim 35, wherein said processing plural product information records includes ignoring minor variances in product information records determined to be insignificant.

39. A method of creating a product catalog stored on computer readable media by aggregating product information from a plurality of product information sources having disparate formats for product information, said method comprising:

processing plural product information records from the product information sources into one or more groups based on which product information records are likely to correspond to the same product;

correlating a unique product ID corresponding to an identified product for each of said groups;

electronically comparing each identified product to categories of a taxonomy to determine a category for the identified products in the taxonomy;

repeating the processing and correlating steps after performing the comparing step to revise which groups said plural product information records fall into;

electronically parsing the product information records corresponding to each group to determine attributes for each categorized product based on the product information records;

electronically generating product specifications based on the determined attributes; and storing the product specifications in the corresponding determined categories of the taxonomy.

40. A method as recited in claim 39, wherein said processing step includes determining which products referred to in said product information records are likely to be the same by comparing data strings associated with the products, and determining a common data string.

41. A method as recited in claim 40, wherein said data strings include at least one of manufacturer part numbers, model identifiers and uniform product codes.

42. A method as recited in claim 40, wherein said processing step comprises comparing product names in the product information records and grouping together all products having a substantially similar product name.

43. A method as recited in claim 39, wherein said comparing step includes the steps of examining the attributes and attribute value sets for each category, and examining actual product information records already classified in each category.

44. A method as recited in claim 39, wherein the correlating step assigns a different product ID to the same products of different colors.

45. The method of claim 39, further comprising determining allied products for at least one of the products.

46. The method as recited in claim 45, wherein said step of determining allied products comprises:

parsing at least one product information record corresponding to a product;

if there is a link in the product information record to related products, following the link to a related product information record;

reverse looking up references to the product in the related product information record; and relating the related product in the related product information record to the product in the catalog.

47. The method as recited in claim 39, wherein said processing plural product information records includes ignoring minor variances in product information records determined to be insignificant.

48. A method of creating a product catalog stored on computer readable media by aggregating product information from a plurality of product information sources having disparate formats for product information, said method comprising:

processing plural product information records from the product information sources into one or more groups based on which product information records are likely to correspond to the same product;

correlating a unique product ID corresponding to an identified product for each of said groups;

comparing each identified product to categories of in a taxonomy to determine a category for the identified products in the taxonomy;

repeating the processing and correlating steps after performing the comparing step to revise which groups said plural product information records fall into;

determining attributes for each categorized product based on the product information records corresponding to each group;

creating product specifications based on the determined attributes; and storing the product specifications in the corresponding determined categories of the taxonomy;

further including the steps of assigning a clustering confidence score to the grouping of information produced by the processing step, and a categorizing confidence score to the categories produced by the comparing step, and repeating said repetition step until said confidence scores stabilize.

49. A method as recited in claim 48, further including the step of flagging the outcome of one or both of the processing step and categorizing step when the confidence score associated with one or both steps falls below a predetermined minimum.

50. A method as recited in claim 49 wherein said flagged outcome is deferred and saved and re-processed when more product information sources become available.

51. A method as recited in claim 49, wherein said flagged outcome is moved to a processing tool for a manual operation.

52. A method of aggregating product information from a plurality of product information sources in a networked computer environment comprising the steps of:

generating a crawler from a server interconnected to the network computer environment to visit the plurality of sources;

gathering product phrase information and characteristics of said product phrase information from each of the plurality of sources via said crawler;

grouping said product phrase information based on which product phrase information are likely to correspond to the same product and based on the characteristics of said product phrase information;

electronically parsing said grouped product phrase information to determine attributes for each product based on at least one of the product phrase information and the characteristics of said product phrase information; and creating a catalog of products based on the determined attributes.

53. The method of claim 52, wherein said at least one characteristic of said phrase includes at least one of frequency, location, font size, font style, font case, font effects, font color, collocation and co-occurrence of said phrase in each of said plurality of sources.

54. The method of claim 53, wherein the plurality of sources include at least one of a manufacturer's product specifications source, a product literature source, and a merchant's information source.

55. The method of claim 52, wherein said crawler includes a product literature crawler that gathers product phrase information from at least one of said manufacturer's product specifications source and said product literature source.

56. The method of claim 52, further comprising the step of comparing said product phrase information to a categories of a taxonomy to determine product category of products described by the product phase information.

57. The method of claim 52, further comprising determining allied products for at least one of the products.

58. The method as recited in claim 57, wherein said step of determining allied products comprises:

parsing at least one product information record corresponding to a product;

if there is a link in the product information record to related products, following the link to a related product information record;

reverse looking up references to the product in the related product information record; and relating the related product in the related product information record to the product in the catalog.

59. The method as recited in claim 52, wherein said grouping said product phrase information includes ignoring minor variances in product phrase information determined to be insignificant.

60. A system for creating a product catalog by aggregating product information from a plurality of product information sources having disparate formats for product information and storing the information in a taxonomy, said method comprising:

means for processing plural product information records from the product information sources into one or more groups based on which product information records are likely to correspond to the same product;

means for correlating a unique product ID corresponding to the product associated with each of said groups to identify the product;

means for electronically comparing each identified product to categories of a taxonomy to determine a category for the identified products in the taxonomy; and means for electronically parsing the product information records corresponding to each group to electronically determine attributes for each categorized product based on the product information records;

means for electronically generating product specifications based on the determined attributes; and means for storing the product specification in the corresponding determined categories of the taxonomy.

61. A system as recited in claim 60, wherein said means for processing includes means for determining which products referred to in said product information records are likely to be the same by comparing data strings associated with the products, and means for determining a common data string.

62. A system as recited in claim 61, wherein said data strings include at least one of manufacturer part numbers, model identifiers and uniform product codes.

63. A system as recited in claim 60, wherein said means for processing comprises comparing product names in the product information records and means for grouping together all products having a substantially similar product name.

64. A system as recited in claim 63, wherein said product names are compared without regard for differences in capitalization and punctuation.

65. A system as recited in claim 63, further comprising means for parsing generic nouns associated with the products and excluding the generic nouns from processing by said means for determining.

66. A system as recited in claim 60, further comprising means for parsing selected adjectives and excluding the selected adjectives form processing by said determining means.

67. A system as recited in claim 60, wherein said means for processing comprises means for considering prices in the product information records associated with the products.

68. A system as recited in claim 60, wherein said means for processing comprises means for considering synonym, hyernym and hyponym relationships in descriptions of the products in the product information records.

69. A system as recited in claim 60, wherein said means for processing comprises means for considering merchant coverage indicated in the product information records.

70. A system as recited in claim 60, wherein said means for processing comprises means for grouping said products into subgroups and/or super groups.

71. A system as recited in claim 60, further comprising means for determining a product name for each identified product.

72. A system as recited in claim 60, further comprising means for determining a product image for each identified product by selecting a most preferable product image from said product information records.

73. The system as recited in claim 72, wherein said means for determining a product image selects said most preferable product image based on at least one of size, type, quality, proportion, and source.

74. A system as recited in claim 60, further comprising means for generating a description of each identified product at least in part from said determined attributes.

75. A system as recited in claim 60, wherein said means for processing comprises means for examining identification codes associated with each product information record by parsing identification codes present in the product information records and comparing said parsed identification codes to determine commonalities between them.

76. A system as recited in claim 75, wherein said means for examining examines each product information record more than once to determine a common identification code associated with each product.

77. The system of claim 60, further comprising means for determining allied products for at least one of the products.

78. The system as recited in claim 77, wherein said means for determining allied products comprises:
  means for parsing at least one product information record corresponding to a product and if there is a link in the product information record to related products, following the link to a related product information record;
  means for reverse looking up references to the product in the related product information record; and
  means for relating the related product in the related product information record to the product in the catalog.

79. A system as recited in claim 60, wherein said means for processing plural product information records further ignores minor variances in product information records determined to be insignificant.

80. The system of claim 60, further comprising a means for aggregating product information from a plurality of product information sources in a networked computer environment.

81. The system of claim 80, further comprising means for generating a crawler from a server interconnected to the network computer environment to visit the plurality of sources.

82. The system of claim 81, further comprising a means for gathering product phrase information and characteristics of said product phrase information from each of the plurality of sources.

83. The system of claim 82, further comprising a means for creating a catalog of products based on the product phrase information and characteristics of said product phrase information.

84. The system of claim 80, wherein said characteristic of said phrase includes at least one of frequency, location, font size, font style, font case, font effects, font color, collocation and co-occurrence of said phrase in each of said plurality of sources.

85. The system of claim 80, wherein the plurality of sources include at least one of a manufacturer's product specifications source, a product literature source, and a merchant's information source.

86. The system of claim 85, wherein said crawler includes a product literature crawler that gathers product phrase information from at least one of said manufacturer's product specifications source and said product literature source.

87. The system of claim 80, further comprising the means for comparing said product phrase information to categories of a taxonomy to determine product category of products described by the product phrase information.

88. A system for creating a product catalog by aggregating product information from a plurality of product information sources having disparate formats for product information and storing the information in a taxonomy, said method comprising:
  means for processing plural product information records from the product information sources into one or more groups based on which product information records are likely to correspond to the same product;
  means for correlating a unique product ID corresponding to the product associated with each of said groups to identify the product;
  means for comparing each identified product to categories of a taxonomy to determine a category for the identified products in the taxonomy; and
  means for determining attributes for each categorized product based on the product information records corresponding to each group;
  means for creating product specifications based on the determined attributes; and
  means for storing the product specification in the corresponding determined categories of the taxonomy;
  wherein said means for determining comprises:
  means for scraping attribute values from plural product information records in a group and assigning a confidence rating to each scraped attribute value; and
  means for merging the attribute values into a set of product specification attributes based on the confidence ratings.

89. The system as recited in claim 88, wherein said means for processing plural product information records further ignores minor variances in product information records determined to be insignificant.

90. A system for creating a product catalog by aggregating product information from a plurality of product information sources having disparate formats for product information and storing the information in a taxonomy, said method comprising:
  means for processing plural product information records from the product information sources into one or more groups based on which product information records are likely to correspond to the same product;

means for correlating a unique product ID corresponding to the product associated with each of said groups to identify the product;

means for comparing each identified product to categories of a taxonomy to determine a category for the identified products in the taxonomy; and means for determining attributes for each categorized product based on the product information records corresponding to each group;

means for creating product specifications based on the determined attributes;

means for storing the product specification in the corresponding determined categories of the taxonomy; and means for determining a product name for each identified product;

wherein said means for determining a name comprises:

means for selecting the best name of multiple variant product names from product information records in a group; and means for cleansing the best name of superfluous and concatenated text; and formatting the cleansed name into a product name that is of a predetermined style.

91. A system for creating a product catalog by aggregating product information from a plurality of product information sources having disparate formats for product information and storing the information in a taxonomy, said method comprising:

means for processing plural product information records from the product information sources into one or more groups based on which product information records are likely to correspond to the same product;

means for correlating a unique product ID corresponding to the product associated with each of said groups to identify the product;

means for comparing each identified product to categories of a taxonomy to determine a category for the identified products in the taxonomy; and means for determining attributes for each categorized product based on the product information records corresponding to each group;

means for creating product specifications based on the determined attributes;

means for storing the product specification in the corresponding determined categories of the taxonomy; and means for determining when an outcome of one or more of said processing, correlating, comparing and determining steps falls below a predetermined confidence level and flagging said outcome for further processing.

92. A system as recited in claim 91, wherein said flagged outcome is deferred and saved and re-processed when more product information sources become available.

93. A system as recited in claim 91, wherein said flagged outcome is moved to a processing tool for a manual operation.

94. The system as recited in claim 91, wherein said means for processing plural product information records further ignores minor variances in product information records determined to be insignificant.

95. A system for aggregating product information from a plurality of product information sources in a networked computer environment of a comprising:

means for generating a crawler from a server interconnected to the network computer environment to visit the plurality of sources;

means for gathering product phrase information and characteristics of said product phrase information from each of the plurality of sources via said crawler; and means for grouping said product phrase information based on which product phrase information are likely to correspond to the same product and the characteristics of said product phrase information;

means for electronically parsing said grouped product phrase information to determine attributes for each product based on at least one of the product phrase information and the characteristics of said product phrase information; and means for creating a catalog of products based on the determined attributes.

96. The system of claim 95, wherein said at least one characteristic of said phrase includes at least one of frequency, location, font size, font style, font case, font effects, font color, collocation and co-occurrence of said phrase in each of said plurality of sources.

97. The system of claim 96, wherein the plurality of sources include at least one of a manufacturer's product specifications source, a product literature source, and a merchant's information source.

98. The system of claim 95, wherein said crawler includes a product literature crawler that gathers product phrase information from at least one of said manufacturer's product specifications source and said product literature source.

99. The system of claim 95, further comprising the means for comparing said product phrase information to a categories of a taxonomy to determine product category of products described by the product phase information.

100. The system as recited in claim 95, wherein said means for grouping said product phrase information further ignores minor variances in product phrase information determined to be insignificant.

* * * * *